US012689623B2

(12) United States Patent
Beveridge

(10) Patent No.: US 12,689,623 B2
(45) Date of Patent: Jul. 21, 2026

(54) CONFIGURING A VIRTUAL DESKTOP IN A VEHICLE DEVICE FOR DATA ANALYTICS

(71) Applicant: VMware LLC, Palo Alto, CA (US)

(72) Inventor: Daniel J. Beveridge, Valrico, FL (US)

(73) Assignee: VMware LLC, Palo Alto, CA (US)

( * ) Notice: Subject to any disclaimer, the term of this patent is extended or adjusted under 35 U.S.C. 154(b) by 78 days.

(21) Appl. No.: 18/765,928

(22) Filed: Jul. 8, 2024

(65) Prior Publication Data

US 2025/0039175 A1      Jan. 30, 2025

Related U.S. Application Data

(60) Provisional application No. 63/528,698, filed on Jul. 25, 2023.

(51) Int. Cl.
| | |
|---|---|
| *H04L 15/16* | (2006.01) |
| *G06F 9/451* | (2018.01) |
| *G06F 9/455* | (2018.01) |
| *G06F 15/16* | (2006.01) |
| *G06F 17/30* | (2006.01) |
| *H04L 9/40* | (2022.01) |

(52) U.S. Cl.
CPC .......... *H04L 63/0876* (2013.01); *G06F 9/452* (2018.02); *G06F 9/45558* (2013.01); *H04L 63/0884* (2013.01); *G06F 2009/45587* (2013.01)

(58) Field of Classification Search
CPC ... H04L 63/0876; H04L 63/0884; H04L 9/40; H04L 63/08; G06F 9/452; G06F 9/45558; G06F 2009/45587; G06F 21/31; G06F 2009/45575; G06F 2009/45562; G06F 2009/45595; H04W 4/40; H04W 12/06; H04W 76/15

USPC ............................................................ 726/6
See application file for complete search history.

(56) References Cited

U.S. PATENT DOCUMENTS

| | | | | |
|---|---|---|---|---|
| 2011/0184993 | A1* | 7/2011 | Chawla ................. | G06F 16/182 |
| | | | | 718/1 |
| 2011/0185292 | A1* | 7/2011 | Chawla ................. | G06F 9/5077 |
| | | | | 709/227 |
| 2011/0185355 | A1* | 7/2011 | Chawla ............... | G06F 9/45558 |
| | | | | 718/1 |
| 2013/0125215 | A1* | 5/2013 | London ................... | G06F 9/452 |
| | | | | 726/4 |

(Continued)

OTHER PUBLICATIONS

European Patent Office, Extended Search Report, Application No. 24190423.4, Dec. 4, 2024, 9 pages.

*Primary Examiner* — Berhanu Shitayewoldetsadik
(74) *Attorney, Agent, or Firm* — Quarles & Brady LLP

(57) ABSTRACT

Some embodiments provide a novel method for analyzing data collected by a vehicle at a first location. On a first device operating in the vehicle, the method instantiates a virtual desktop first virtual machine (VM) for remote use of the first device by a remote user that uses a remote second device at a remote second location. The method instantiates a data collection second VM for local use of the first device to collect a set of data at the first location and store the set of data at the vehicle. The method facilitates interaction between the virtual desktop first VM and the remote user over a network for the remote user to access the data collection second VM to analyze the set of data without needing to forward the set of data over the network to the remote second device.

19 Claims, 12 Drawing Sheets

(56)  References Cited

U.S. PATENT DOCUMENTS

| | | | |
|---|---|---|---|
| 2014/0020083 A1* | 1/2014 | Fetik | G06F 21/78 |
| | | | 726/11 |
| 2014/0122731 A1* | 5/2014 | Burch | H04L 9/321 |
| | | | 709/228 |
| 2014/0366093 A1* | 12/2014 | Oh | G06F 9/5072 |
| | | | 718/1 |
| 2015/0150007 A1* | 5/2015 | Belkine | G06F 11/3409 |
| | | | 718/1 |
| 2016/0098225 A1* | 4/2016 | Huang | G06F 11/3452 |
| | | | 711/154 |
| 2016/0179566 A1* | 6/2016 | Chawla | G06F 9/45533 |
| | | | 718/1 |
| 2016/0378535 A1* | 12/2016 | Oh | G06F 9/4451 |
| | | | 718/1 |
| 2017/0111783 A1* | 4/2017 | Zhang | H04W 8/20 |
| 2017/0262214 A1* | 9/2017 | Venkatesh | G06F 9/45558 |
| 2018/0063185 A1* | 3/2018 | Fan | H04L 63/102 |
| 2020/0159625 A1* | 5/2020 | Hutcheson | G06F 11/1461 |
| 2021/0182211 A1* | 6/2021 | Ki | H04L 9/0891 |
| 2021/0192867 A1* | 6/2021 | Fang | G07C 5/0816 |
| 2022/0083355 A1* | 3/2022 | Kelly | G06F 9/5061 |
| 2022/0182317 A1* | 6/2022 | Thoria | H04L 45/04 |
| 2022/0188132 A1* | 6/2022 | Yue | G06F 3/0481 |
| 2022/0334903 A1* | 10/2022 | Pole | G06F 16/24558 |

* cited by examiner

CONFIGURING A VIRTUAL DESKTOP IN A VEHICLE DEVICE FOR DATA ANALYTICS

CROSS REFERENCE TO RELATED APPLICATIONS

This application claims the benefit of U.S. Provisional Application No. 63/528,698 filed on Jul. 25, 2023 and titled, "CONFIGURING A VIRTUAL DESKTOP IN A VEHICLE DEVICE FOR DATA ANALYTICS," the entire teachings of which is hereby incorporated by reference in its entirety for all purposes.

BACKGROUND

Commercial vehicles, such as first responder vehicles and police vehicles, are transforming into mobile micro-datacenters in which hypervisor platforms consolidate multiple applications and perform real-time data collection and analytics operations to speed up the time to respond to crimes (and other types of emergencies, such as medical emergencies). With the aid of software-defined wide area network (SD-WAN) technology, a multi-carrier connection can be established in a vehicle, which greatly expands the reliability of a wireless data connection while also expanding the available bandwidth available for application traffic. However, current cellular data connections are still inadequate to perform the transfer of bulky data from one location (e.g., a vehicle) to another location (e.g., the cloud or a remote datacenter) in a timely manner. Because of this, various forms of bulky data collected at a vehicle cannot be immediately observed by others outside of the vehicle. This delays analysis (1) until the vehicle is docked at a depot or (2) until a slow transfer of the bulky data to a remote location has completed.

For example, images captured of a crime victim's phone after the reporting of a crime are typically taken into evidence and held for months until the process of imaging the phone and transferring its data to the appropriate police location has been completed. This issue leads to victims dramatically reducing the incidence of reporting such crimes to the police, for fear of losing evidence due to this slow and inefficient process. Hence, methods and systems are needed for the collection of data at a particular location and immediate remote processing of such data.

BRIEF SUMMARY

Some embodiments provide a novel method for analyzing data collected by a vehicle at a first location. On a first device operating in the vehicle, the method instantiates a virtual desktop first virtual machine (VM) for remote use of the first device by a remote user that uses a remote second device at a remote second location. The method instantiates a data collection second VM for local use of the first device to collect a set of data at the first location and store the set of data at the vehicle. The method facilitates interaction between the virtual desktop first VM and the remote user over a network for the remote user to access the data collection second VM to analyze the set of data without needing to forward the set of data over the network to the remote second device.

In some embodiments, the method is performed by a hypervisor of the first device. The hypervisor in some embodiments also configures a micro-broker module within the virtual desktop VM to authenticate the remote user and facilitate the interaction between the virtual desktop VM and the remote user. By authenticating the remote user, the micro-broker module helps prevent unauthorized users from accessing the first device or the data stored at the vehicle. In some embodiments, the micro-broker module authenticates a set of user authentication credentials (e.g., a username and password) associated with the remote user. Conjunctively or alternatively, the micro-broker module authenticates a set of device authentication credentials (e.g., a Media Access Control (MAC) address and/or an Internet Protocol (IP) address) associated with the remote second device. The micro-broker module of some embodiments stores tables that includes records for authorized remote users and their usernames and passwords and records for authorized remote devices and their MAC and IP addresses.

Alternatively to configuring a micro-broker module within the virtual desktop VM, other embodiments configure a connection broker module on the first device to authenticate the remote user and facilitate the interaction between the virtual desktop VM and the remote user. In such embodiments, the connection broker module is able to authenticate remote users to access multiple virtual desktop VMs instantiated on the first device.

The hypervisor in some embodiments configures the micro-broker module with a set of rules indicating which resources on the first device the remote user is allowed to access. In such embodiments, different remote users are allowed to access different resources (e.g., VMs, applications, stored data) of the first device. In some of these embodiments, the resources on the first device the remote user is authorized to access comprises a set of one or more data collection and analysis VMs. By accessing the set of data collection and analysis VMs, the remote user can remotely perform data analysis on data that is collected and stored at the vehicle, without having to forward the data to the remote second device.

In some embodiments, the data stored at the vehicle is stored on the first device, such as on a local data storage of the first device. In other embodiments, the data is stored on a particular storage device connected to the first device. In such embodiments, the particular storage device is a secure solid-state drive (SSD), which helps the hypervisor maintain secure storage of the data.

The hypervisor in some embodiments configures a synchronization agent on the virtual desktop VM to replicate the data stored on the secure SSD to a remote data storage. This ensures that, in the event of data loss on the secure SSD, the data is still retrievable from the remote data storage. In some embodiments, the remote data storage is a cloud data storage of a cloud site. In other embodiments, the remote data storage is a datacenter data storage of a remote datacenter site.

In some embodiments, the hypervisor detects potential unauthorized access to the secure SSD. This is in some embodiments due to an unauthorized remote user accessing the first device. In such embodiments, the remote user is a first remote user, and the hypervisor detects unauthorized access to the virtual desktop VM by a second remote user using a remote third device. After detecting potential unauthorized access to the secure SSD, the hypervisor deletes the data stored on the secure SSD, but because the data has been replicated to the remote data storage by the synchronization agent, the data is still able to be retrieved by authorized remote users.

The network over which the virtual desktop VM and the remote user communicate is in some embodiments a software-defined wide area network (SD-WAN). In such embodiments, the remote user interacts with the virtual desktop VM using a set of one or more wireless network links associated with an edge router in the vehicle that connects the vehicle to the SD-WAN. In some of these embodiments, the set of wireless network links include at least two wireless network links provided by at least two different service providers. By providing different wireless network links of different service providers, the edge router ensures that there is a stable and reliable connection to the SD-WAN at all times.

In some embodiments, the edge router is one of (1) an edge router appliance, (2) an edge router that executes on a computer that operates in the vehicle, or (3) an edge router that executes on a machine that executes on the computer. This computer is in some embodiments the first device, and is a different computer in other embodiments. The virtual desktop VM is in some embodiments a first virtual desktop VM. In such embodiments, the hypervisor instantiates a set of two or more virtual desktop VMs including the first virtual desktop VM on the first device. In some embodiments, each virtual desktop VM is associated with a different remote user such that no two remote users access a same virtual desktop VM. In other embodiments, at least one virtual desktop VM is shared by at least two remote users.

Some embodiments provide a novel method for remotely performing data analysis on a set of data collected using a first device operating in a vehicle at a first location. At a remote second device used by a remote user at a remote second location, the method accesses, over a network, a first VM executing on the first device allowing remote use of a second VM executing on the first device to produce analysis results of data that is collected and stored at the vehicle. The method uses the first VM (1) to direct the second VM to analyze the set of data to produce a set of analysis results, (2) to generate a rendered image that shows the set of analysis results, and (3) to forward the rendered image through the network to the remote second device for the remote user to view the set of analysis results.

In some embodiments, the first VM is a virtual desktop VM executing on the first device. The virtual desktop VM is instantiated on the first device to allow remote use of the first device. In some embodiments, the second VM is a data collection and analysis VM executing on the first device that is able to be accessed by remote devices, including the remote second device, through the virtual desktop VM. By allowing remote access of the data collection and analysis second VM, data collected and stored at the vehicle can be view and analyzed immediately without needing to actually forward the data to the remote users.

The rendered image is in some embodiments a first rendered image. In such embodiments, the virtual desktop VM provides a second rendered image of a user interface (UI) of the first device. Using the virtual desktop VM to direct the data collection and analysis VM in such embodiments includes interacting with the second rendered image in order to direct the data collection and analysis VM to produce the set of analysis results. For example, as the remote user on the remote second device interacts with the second rendered image (e.g., using keyboard selections, mouse clicks, etc.), a micro-broker module executing on the first VM translates these interactions into actual actions to take on the first device. This allows for the remote user using the remote second device to direct the second VM to produce the analysis results. In other embodiments, a connection broker module executing on the first device translates the interactions into actual actions to take on the first device.

In some embodiments, the UI of the first device is a first UI, and the second rendered image includes the set of data to view on a second UI the remote second device. By viewing the set of data as an image on the second UI instead of forwarding the set of data directly to the remote second device, the forwarding time is drastically reduced, resulting in more immediate viewing of the set of data on the remote second device.

The method of some embodiments uses the virtual desktop VM to direct the data collection and analysis VM to store the set of analysis results at the vehicle. In such embodiments, the set of analysis results are stored at the vehicle so that it can be forwarded to another device in the future. In some embodiments, before accessing the first VM, the method sends, to the micro-broker module of the first device, a first data message requesting access to the first VM. After sending this first data message, the method receives, from the micro-broker module, a second data message allowing access to the first VM.

In some embodiments, the micro-broker module allows access to the first VM based on a set of user authentication credentials (e.g., a username and password) associated with the remote user. Conjunctively or alternatively, the micro-broker module allows access to the first VM also based on a set of device authentication credentials (e.g., a MAC address and/or an IP address) associated with the remote second device.

The network over which the remote second device accesses and uses the virtual desktop VM is in some embodiments an SD-WAN. In such embodiments, the remote second device accesses the virtual desktop VM using a set of one or more wireless network links associated with an edge router in the vehicle that connects the vehicle to the SD-WAN. In some of these embodiments, the set of wireless network links include at least two wireless network links provided by at least two different service providers. By providing different wireless network links of different service providers, the edge router ensures that there is a stable and reliable connection to the SD-WAN at all times.

In some embodiments, the edge router is one of (1) an edge router appliance, (2) an edge router that executes on a computer that operates in the vehicle, or (3) an edge router that executes on a machine that executes on the computer. This computer is in some embodiments the first device, and is a different computer in other embodiments. The data, including the set of data, is in some embodiments stored on a set of data storages of the first device. In other embodiments, the data, including the set of data, is stored on a particular storage device connected to the first device. In such embodiments, the particular storage device is a secure SSD, which helps maintain secure storage of the data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
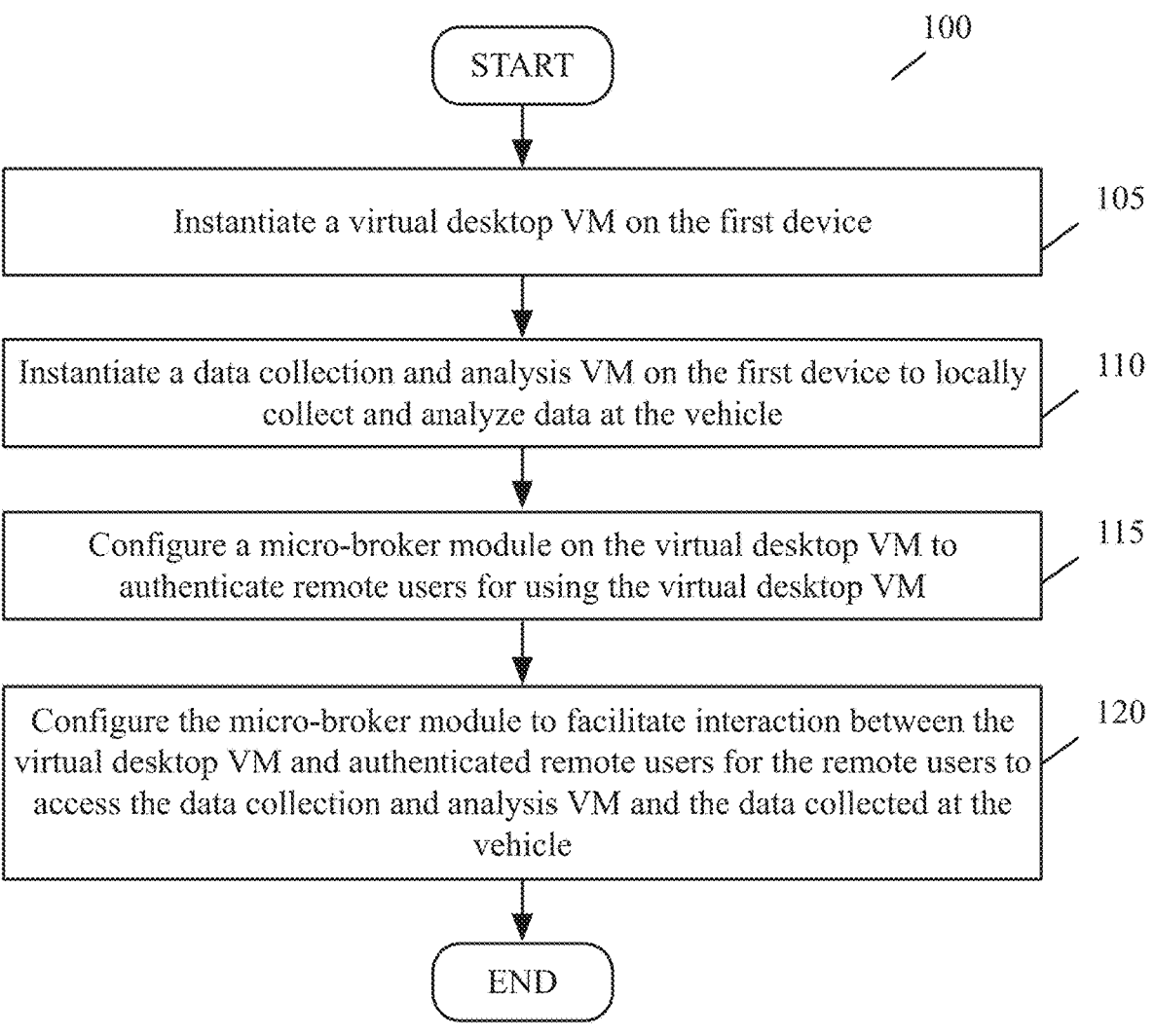
FIG. 1 conceptually illustrates a process of some embodiments for enabling remote access to a first device operating in a vehicle residing at a first location.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for analyzing data collected by a vehicle at a first location. On a first device operating in the vehicle, the method instantiates a virtual desktop first virtual machine (VM) for remote use of the first device by a remote user that uses a remote second device at a remote second location. The method instantiates a data collection second VM for local use of the first device to collect a set of data at the first location and store the set of data at the vehicle. The method facilitates interaction between the virtual desktop first VM and the remote user over a network for the remote user to access the data collection second VM to analyze the set of data without needing to forward the set of data over the network to the remote second device.

In some embodiments, the method is performed by a hypervisor of the first device. The hypervisor in some embodiments also configures a micro-broker module within the virtual desktop VM to authenticate the remote user and facilitate the interaction between the virtual desktop VM and the remote user. By authenticating the remote user, the micro-broker module helps prevent unauthorized users from accessing the first device or the data stored at the vehicle. In some embodiments, the micro-broker module authenticates a set of user authentication credentials (e.g., a username and password) associated with the remote user. Conjunctively or alternatively, the micro-broker module authenticates a set of device authentication credentials (e.g., a Media Access Control (MAC) address and/or an Internet Protocol (IP) address) associated with the remote second device. The micro-broker module of some embodiments stores tables that includes records for authorized remote users and their usernames and passwords and records for authorized remote devices and their MAC and IP addresses.

Alternatively to configuring a micro-broker module within the virtual desktop VM, other embodiments configure a connection broker module on the first device to authenticate the remote user and facilitate the interaction between the virtual desktop VM and the remote user. In such embodiments, the connection broker module is able to authenticate remote users to access multiple virtual desktop VMs instantiated on the first device.

In some embodiments, the data stored at the vehicle is stored on the first device, such as on a local data storage of the first device. In other embodiments, the data is stored on a particular storage device connected to the first device. In such embodiments, the particular storage device is a secure solid-state drive (SSD), which helps the hypervisor maintain secure storage of the data.

The hypervisor in some embodiments configures a synchronization agent on the virtual desktop VM to replicate the data stored on the secure SSD to a remote data storage. This ensures that, in the event of data loss on the secure SSD, the data is still retrievable from the remote data storage. In some embodiments, the remote data storage is a cloud data storage of a cloud site. In other embodiments, the remote data storage is a datacenter data storage of a remote datacenter site.

In some embodiments, the hypervisor detects potential unauthorized access to the secure SSD. This is in some embodiments due to an unauthorized remote user accessing the first device. In such embodiments, the remote user is a first remote user, and the hypervisor detects unauthorized access to the virtual desktop VM by a second remote user using a remote third device. After detecting potential unauthorized access to the secure SSD, the hypervisor deletes the data stored on the secure SSD, but because the data has been replicated to the remote data storage by the synchronization agent, the data is still able to be retrieved by authorized remote users.

The network over which the virtual desktop VM and the remote user communicate is in some embodiments a software-defined wide area network (SD-WAN). In such embodiments, the remote user interacts with the virtual desktop VM using a set of one or more wireless network links associated with an edge router in the vehicle that connects the vehicle to the SD-WAN. In some of these embodiments, the set of wireless network links include at least two wireless network links provided by at least two different service providers. By providing different wireless network links of different service providers, the edge router ensures that there is a stable and reliable connection to the SD-WAN at all times.

In some embodiments, the edge router is one of (1) an edge router appliance, (2) an edge router that executes on a computer that operates in the vehicle, or (3) an edge router that executes on a machine that executes on the computer. This computer is in some embodiments the first device, and is a different computer in other embodiments. The virtual desktop VM is in some embodiments a first virtual desktop VM. In such embodiments, the hypervisor instantiates a set of two or more virtual desktop VMs including the first virtual desktop VM on the first device. In some embodiments, each virtual desktop VM is associated with a different remote user such that no two remote users access a same virtual desktop VM. In other embodiments, at least one virtual desktop VM is shared by at least two remote users.

Some embodiments provide a novel method for remotely performing data analysis on a set of data collected using a first device operating in a vehicle at a first location. At a remote second device used by a remote user at a remote second location, the method accesses, over a network, a first VM executing on the first device allowing remote use of a second VM executing on the first device to produce analysis results of data that is collected and stored at the vehicle. The method uses the first VM (1) to direct the second VM to analyze the set of data to produce a set of analysis results, (2) to generate a rendered image that shows the set of analysis results, and (3) to forward the rendered image through the network to the remote second device for the remote user to view the set of analysis results.

In some embodiments, the first VM is a virtual desktop VM executing on the first device. The virtual desktop VM is instantiated on the first device to allow remote use of the first device. In some embodiments, the second VM is a data collection and analysis VM executing on the first device that is able to be accessed by remote devices, including the remote second device, through the virtual desktop VM. By allowing remote access of the data collection and analysis second VM, data collected and stored at the vehicle can be view and analyzed immediately without needing to actually forward the data to the remote users.

The rendered image is in some embodiments a first rendered image. In such embodiments, the virtual desktop VM provides a second rendered image of a user interface (UI) of the first device. Using the virtual desktop VM to direct the data collection and analysis VM in such embodiments includes interacting with the second rendered image in order to direct the data collection and analysis VM to produce the set of analysis results. For example, as the remote user on the remote second device interacts with the second rendered image (e.g., using keyboard selections, mouse clicks, etc.), a micro-broker module executing on the first VM translates these interactions into actual actions to take on the first device. This allows for the remote user using the remote second device to direct the second VM to produce the analysis results. In other embodiments, a connection broker module executing on the first device translates the interactions into actual actions to take on the first device.

In some embodiments, the UI of the first device is a first UI, and the second rendered image includes the set of data to view on a second UI the remote second device. By viewing the set of data as an image on the second UI instead of forwarding the set of data directly to the remote second device, the forwarding time is drastically reduced, resulting in more immediate viewing of the set of data on the remote second device.

The method of some embodiments uses the virtual desktop VM to direct the data collection and analysis VM to store the set of analysis results at the vehicle. In such embodiments, the set of analysis results are stored at the vehicle so that it can be forwarded to another device in the future. In some embodiments, before accessing the first VM, the method sends, to the micro-broker module of the first device, a first data message requesting access to the first VM. After sending this first data message, the method receives, from the micro-broker module, a second data message allowing access to the first VM.

Virtual desktop technology allows for a user to connected to a VM hosting a desktop environment in a remote datacenter or cloud location. Virtual desktop technology works by exporting a streaming image of the desktop back to the user who uses a virtual desktop infrastructure (VDI) client software to (1) establish a connection to the desktop, (2) authenticate their use of the desktop, and (3) communicate their keyboard and mouse movements to the virtual desktop. The traffic pattern of virtual desktops is in some embodiments asymmetric, with narrow bandwidth flowing to the desktop because of modest keyboard and mouse commands. In some embodiments, a higher bandwidth leaves the desktop and travels back to the remote user because of video streams being forwarded to the remote user to represent the movements on screen.

When a remote user interacts with a virtual desktop of a device, the remote user is virtually operating the device as if they were present at the same location as the device. Because of this, the remote user in some embodiments operates on the device's VMs, applications, and data as if they were directly using the device. because of this, data intensive operations, such as data streaming and analyzation, can be performed remotely, without having to actually forward data to the remote user. By instantiating a virtual desktop on a device in a vehicle, remote users of some embodiments can immediately view and analyze data that is collected at the vehicle, without the data needing to be forwarded to them.

This is very useful with bulky data that is collected at one location but needs to be analyzed by a person at another location. While the below described embodiments will be described in relation to using a virtual desktop on a vehicle device, the described embodiments are also applicable to any device residing at a location that collects and stores data that is to be used by a person residing in another location. For example, some embodiments instantiate a virtual desktop on a first device in a first location of an SD-WAN. Instead of forwarding data from the first device to a second device in a second location of the SD-WAN, a user of the second device can instead access the virtual desktop of the first device to perform operations with the data.

FIG. 1 conceptually illustrates a process 100 of some embodiments for enabling remote access to a first device operating in a vehicle residing at a first location. The process 100 is performed in some embodiments so that remote users are able to access one or more resources (e.g., VMs, applications, etc.) executing on the first device and/or data that is collected by the first device at the first location. In some embodiments, the process 100 is performed by a hypervisor of the first device.

The process 100 begins by instantiating (at 105) a virtual desktop VM on the first device. In some embodiments, the hypervisor of the first device creates a virtual desktop VM on the first device, which enables the first device to be accessed by remote users over a network (e.g., an SD-WAN). In some embodiments, the hypervisor instantiates one virtual desktop VM which is shared by every remote user accessing the first device. In other embodiments, the hypervisor instantiates a set of virtual desktop VMs such that no two remote users access the same virtual desktop VM. In some of these embodiments, the hypervisor initially instantiates multiple VMs for individual use by multiple remote users. In other embodiments, the hypervisor initially instantiates one virtual desktop VM, and after this virtual desktop VM is accessed by a first remote user, the hypervisor instantiates another virtual desktop VM to be used in the future by a second remote user.

Next, the process 100 instantiates (at 110) a data collection and analysis VM on the first device to locally collect and analyze data at the vehicle. The hypervisor in some embodiments instantiates this second VM on the first device for local users (i.e., users locally operating the vehicle and the first device) to collect data for analyzation. For example, the vehicle is in some embodiments a police vehicle, and local users of the police vehicle use the data collection and analysis VM to collect evidence on site (i.e., at the first location). This data is in some embodiments stored on the first device, and in other embodiments stored on a particular storage device in the police vehicle (e.g., a secure SSD). Because the virtual desktop VM is instantiated on the first device, remote users can access the collected data and use the data collection and analysis VM to remotely view and analyze the collected data without having to forward the data to their remote devices.

At 115, the process 100 configures a micro-broker module on the virtual desktop VM to authenticate remote users for using the virtual desktop VM. In some embodiments, before any remote users are able to remotely access a virtual desktop VM, the remote users must be authenticated by the micro-broker module. In some embodiments, the micro-broker module is a program or application executing within the virtual desktop VM to implement the virtual desktop for the first device. When authenticating a remote user, the micro-broker module in some embodiments authenticates a set of user credentials (e.g., a username and password) associated with the remote user. In such embodiments, the micro-broker module receives the user credentials in the remote user's request for access.

Conjunctively or alternatively, the micro-broker module in some embodiments authenticates a set of device credentials (e.g., a MAC address and/or an IP address) associated with the remote device used by the remote user. In these embodiments, the device credentials are received in the request for access. Any type of authentication credentials may be used to authenticate a remote user or a remote device.

In some embodiments, in configuring the micro-broker module to authenticate remote users, the hypervisor configures the micro-broker module with a set of rules indicating which resources (e.g., VMs, applications, etc.) different remote users are allowed to access. For example, the set of rules in some embodiments allows a first particular remote user to access the data collection and analysis VM and all of the locally collected data using the virtual desktop, but only allows a second particular remote user to access the data collection and analysis VM and a subset of the locally collected data using the virtual desktop.

Next, the process 100 configures (at 120) the micro-broker module to facilitate interaction between the virtual desktop VM and authenticated remote users for the remote users to access the data collection and analysis VM and the data collected at the vehicle. In some embodiments, the micro-broker module facilitates the interaction between the virtual desktop VM and a remote user by generating and forwarding a rendered image of the first device to the remote user so that the remote user can see the first device and its resources on their remote device as if they were directly using the first device. As the remote user interacts with the rendered image (e.g., with keyboard selections, mouse clicks, etc.), the micro-broker module takes these interactions and translates them into actual actions using the virtual desktop VM so it appears on the first device that it is being controlled by the remote user. This back-and-forth interaction between the micro-broker module and the remote user allows for the remote user to use the first device. After the hypervisor configures the micro-broker module to facilitate interactions between the virtual desktop VM and authenticated remote users, the process 100 ends.

Figure 2:
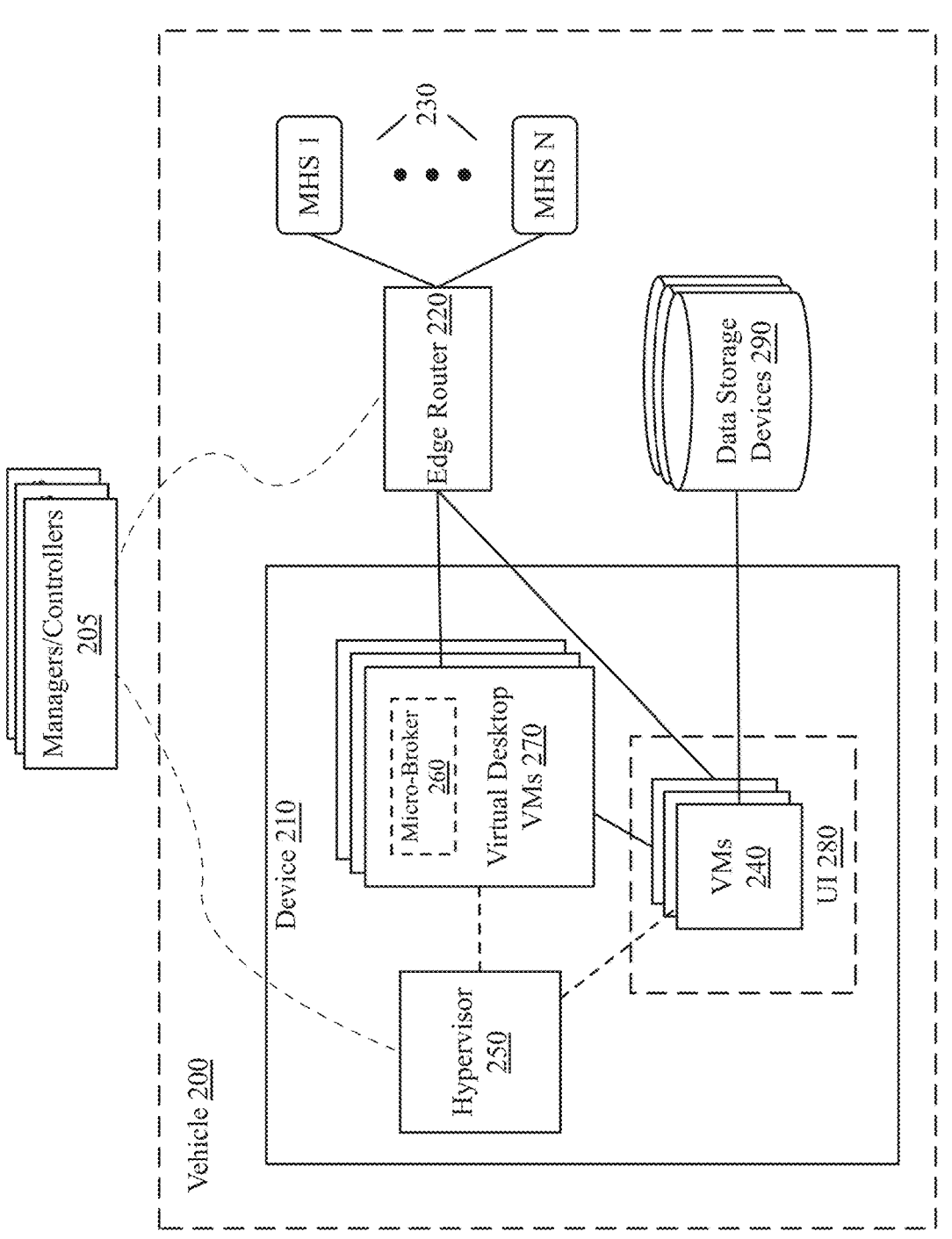
FIG. 2 illustrates an example vehicle including components managed and configured by a set of managers and controllers.

FIG. 2 illustrates an example vehicle 200 including components managed and configured by a set of managers and controllers 205. In this example, the vehicle 200 includes a device 210 and an edge router 220 that connects to the manager and controller set 205 using a set of one or more wireless network connection links 230 (e.g., mobile hotspots (MHSs)). The edge router 220 is in some embodiments an edge router appliance, an edge router that executes on a computer operating in the vehicle 200, or an edge router that executes on a machines executing on a computer in the vehicle 200. The edge router 220 can use any number of wireless network connection links 230 provided by any number of cellular providers to connect to the manager and controller set 205. These wireless network connection links 230 are also used in some embodiments to connect the device 210 to remote users using remote devices.

The manager and controller set 205 is in some embodiments a set of management servers that implement a management plane (MP) and a set of controllers that implement a control plane (CP) of an SD-WAN that connects to the vehicle 200. In some of these embodiments, the device 210 executes at least one of a local control plane (LCP) module and a local management plane (LMP) module respectively associated with the CP and the MP. The manager and controller set 205 operates in a different location than the vehicle 200, such as at a public or private cloud datacenter. Further information regarding managers, controllers, and an SD-WAN connected to a vehicle will be described below.

The vehicle 200 includes a device 210. In some embodiments, the device 210 is a computer. While only one device 210 is drawn in this figure, one of ordinary skill would understand that any number of devices can execute in the vehicle 200 and be used by remote users using a virtual desktop. The device 210 in some embodiments includes a set of one or more machines 240, a hypervisor 250, a set of one or more virtual desktop VMs 270 each executing a micro-broker 260, and a UI 280. The device 210 can execute any number of machines 240 that perform any suitable types of operations (e.g., data collection, data analysis and analytics, etc.). In some embodiments, the machines 240 are at least one of VMs, containers, and Pods. Each VM 240 in some embodiments performs a set of operations for a set of one or more applications. These operations are in some embodiments directed to be performed by one or more local users of the vehicle 200 through a UI 280. Conjunctively or alternatively, they are performed by one or more remote users through the virtual desktop VM 270.

The hypervisor 250 is in some embodiments configured by the manager and controller set 205 to configure the machines 240, the micro-brokers 260, and the set of virtual desktop VMs 270. For instance, the hypervisor 250, as directed by the manager and controller set 205, instantiates and updates the machines 240 and the virtual desktop VMs 270, and configures the micro-broker 260. In some embodiments, the hypervisor 250 configures the set of virtual desktop VMs 270 and the machines 240 by directing a device OS (not shown) to configure them.

The hypervisor 250 in some embodiments instantiates the set of virtual desktop VMs 270 in the device 210 for remote users to access the machines 240 using the wireless network links 230. In some embodiments, the hypervisor 250 instantiates a particular number of virtual desktop VMs 270 to be shared by remote users. For example, the hypervisor 250 in some embodiments instantiates one virtual desktop VM 270 on the device 210 to be shared by all remote users. As another example, the hypervisor 250 in some embodiments instantiates a particular number of virtual desktop VMs (e.g., four virtual desktop VMs) on the device 210 to be shared by the remote users.

In other embodiments, the hypervisor 250 instantiates a different virtual desktop VM 270 for each remote user authenticated for access to the device 210 such that no two remote users use a same virtual desktop VM. In some of these embodiments, the hypervisor 250 instantiates a new virtual desktop VM 270 after a remote user has requested access to the device 210. In other embodiments, the hypervisor 250 instantiates a particular set of virtual desktop VMs 270 on the device 210, and, after each virtual desktop VM has been associated with a remote user, the hypervisor 250 then instantiates more virtual desktop VMs on the device 210.

When a remote user requests access to one of the virtual desktop VMs 270 over the set of wireless network links 230, the virtual desktop VM's micro-broker 260 receives the request and authenticates the remote user and/or the device the remote user is using. In some of these embodiments, once a micro-broker 260 of a particular virtual desktop VM 270 allows a particular remote user to access the particular virtual desktop VM, the micro-broker 260 will not allow any other remote user access to the particular virtual desktop VM. In such embodiments, no two remote users access a same virtual desktop VM 270.

Rather than executing a different micro-broker 260 within each virtual desktop VM 270, some embodiments configure a single connection broker module on the device 210 to facilitate interactions between users and all of the virtual desktop VMs 270. In such embodiments, when the connection broker receives a remote user's request to access the set of virtual desktop VMs 270, the connection broker authenticates the remote user and assigns a particular virtual desktop VM to the remote user. In some of these embodiments, this is because only one remote user uses each virtual desktop VM. In other embodiments, even if two or more remote users use a same virtual desktop VM, this is because each remote user uses the same virtual desktop VM for each session.

For example, a particular remote user is assigned a particular virtual desktop VM for accessing the machines 240 during a first session. After the remote user ends this session, the remote user does not access the virtual desktop VM anymore. When the remote user requests a second session to access the machines 240, the connection broker assigns the same virtual desktop VM to the remote user that they used in the first session. In some embodiments, the second session renders an image of the device 210 to the remote user exactly as the remote user left it at the end of the first session (i.e., the virtual desktop VM is a persistent virtual desktop). This allows for the remote user to customize their virtual desktop VM and maintain the state of their virtual desktop across multiple sessions. In other embodiments, the second session renders an image of the device 210 to the remote user that shows the device 210 as if the remote user never used the device 210 before (i.e., the virtual desktop VM is a non-persistent virtual desktop). In these embodiments, the connection broker 260 presents the same rendered image of the device 210 to the remote user at the beginning of each session.

In some embodiments, the machines 240 include one or more data collection and/or analysis VMs for collecting and analyzing data that is collected at the vehicle's location. In some of these embodiments, the vehicle 200 includes a set of one or more data storage devices 290 for storing data collected by the device 210 (i.e., by one or more data collection VMs 240 executing on the device 200). The vehicle 200 can include any number of data storage devices 290. The data storage devices 290 are in some embodiments secure SSDs.

A data collection VM 240 executing on the device 210 is in some embodiments the only VM associated with a particular data storage device 290. In such embodiments, the data storage device 290 is presented to the virtual desktop VM 270 with the aid of a direct passthrough feature of the hypervisor 250. Making a particular data storage device exclusively available to a particular VM on the device 210 allows for specialized drivers within the device 210 to access firmware and basic input/output system (BIOS) features of the device 210.

In some embodiments, the data stored on the data storage device 290 is synchronized to a remote location, which may take a large amount of time (e.g., several days). However, because remote users are able to access VMs 240 (such as data collection and analysis VMs) on the device 210 through the virtual desktop VMs 270, analysis and operational insights on the data collected at the vehicle 200 can be performed immediately. For example, bulky data (e.g., phone images) is in some embodiments collected at the vehicle 200 and stored on the data storage devices 290. Remote users access the device 210 using the virtual desktop VMs 270, and immediately view and analyze the data without having to actually forward the bulky data to the remote users.

Because the set of micro-brokers 260 forwards rendered images of the device 210 to the remote users (which is much smaller data and faster to forward than the collected data stored on the data storage devices 290), the set of micro-brokers 260 allows for the remote users to efficiently view and analyze the data. In some embodiments, the remote users use analysis VMs on the device 210 to analyze the data remotely, and store the analyzed results in the data storage devices 290. This ability to project the specialized skills of a small set of experts located in diverse locations into one or various remote vehicles is highly efficient, reducing the number of such highly specialized technicians needed to service a large geographic area.

Figure 3:
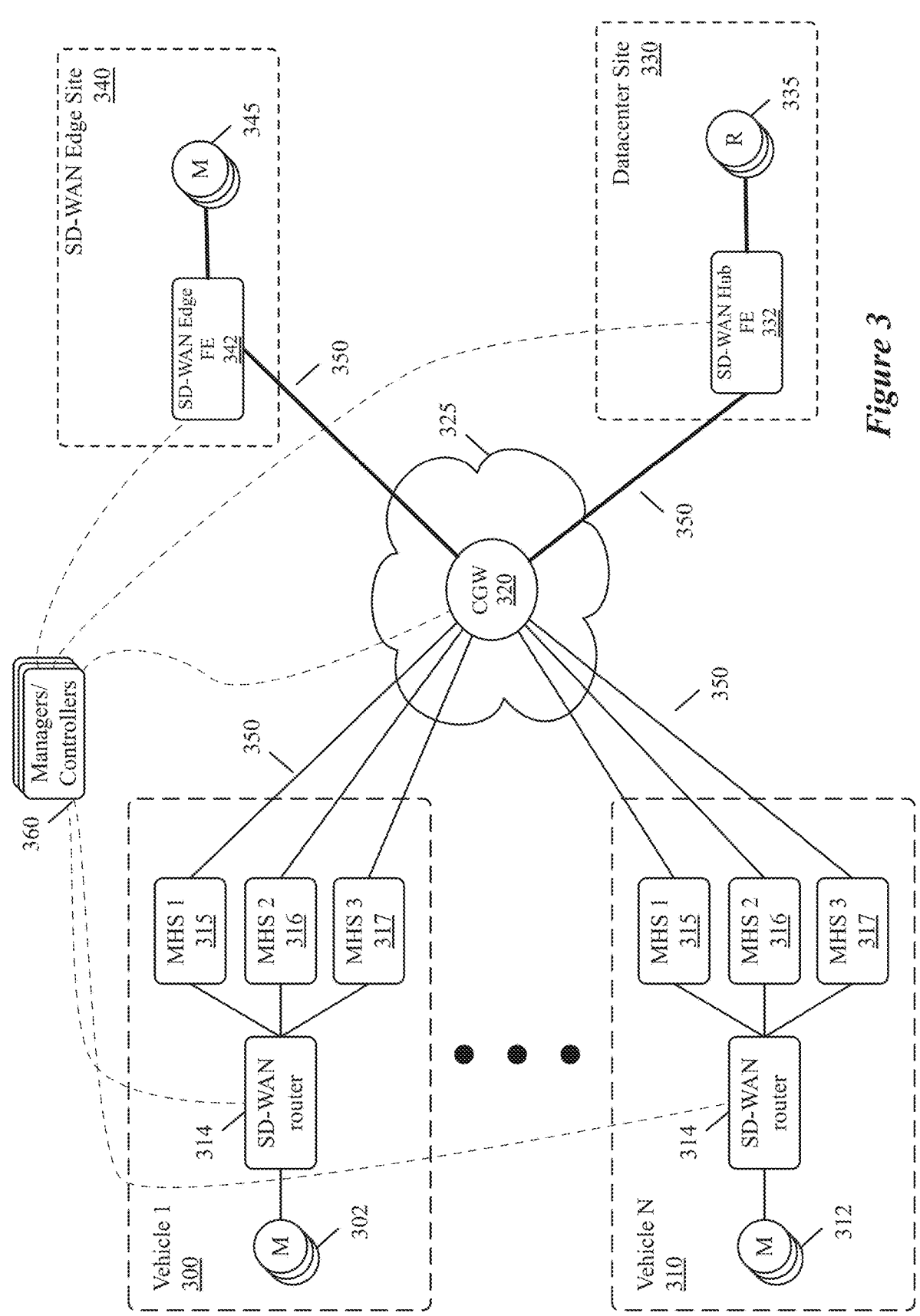
FIG. 3 example vehicles that communicate with various components of an SD-WAN.

As discussed previously, a vehicle in some embodiments connects to an SD-WAN to allow for remote users to access one or more devices operating in the vehicle. FIG. 3 illustrates an example of vehicles 300 and 310 that communicate with various components of an SD-WAN. Any number of vehicles 1–N may be used. The vehicles 300 and 310 respectively include sets of one or more compute machines 302 and 312, SD-WAN routers 304 and 314, and network links 305-307 and 315-317. The SD-WAN connects a cloud gateway 320, a datacenter site 330, and a branch site 340.

The cloud gateway (CGW) 320 in some embodiments is a forwarding element that is in a private or public datacenter 325. The CGW 320 in some embodiments has secure connection links (e.g., tunnels) with edge forwarding elements (e.g., SD-WAN edge FE 342) at multi-machine sites (e.g., SD-WAN edge site 340 with multiple machines 345), such as branch offices, datacenters, etc. These multi-machine sites are often at different physical locations (e.g., different buildings, different cities, different states, etc.) and are referred to in some embodiments as multi-machine sites or nodes. Two multi-machine sites 330 and 340 are illustrated in this figure, with one of them being a branch site 340, and one being a datacenter site 330. The branch site is shown to include an edge forwarding node 342, while the datacenter site 330 is shown to include a hub forwarding node 332. The edge forwarding element (e.g., SD-WAN edge FE 342) exchanges data messages with one or more cloud gateways 320 through one or more connection links 350 (e.g., multiple connection links available at the edge forwarding element).

In some embodiments, each edge forwarding element (e.g., edge forwarding elements 332 and 342) includes a router that uses routing records to forward data messages throughout the SD-WAN. These routing records are in some embodiments next-hop forwarding records. In some embodiments, each edge forwarding element connects to an external network through two or more physical links (e.g., a cable modem link, a 5G link, a multiprotocol label switching (MPLS) link, etc.). In such embodiments, each edge forwarding element connects to each of these physical links through another forwarding element, such as a cable modem, a 5G wireless transceiver, an MPLS appliance, etc. Two or more of the different physical links and their respective forwarding elements in some embodiments are provided by different service providers.

Edge forwarding elements are in some embodiments connected via a direct link, through a CGW, or through a hub. Starting at a CGW, the CGW in some embodiments acts as a route reflector, such as for advertising data messages throughout the SD-WAN. The CGW in some embodiments directs end-to-end connections to form the direct link. In some embodiments, the CGW directs an end-to-end connection through a hub, in order to perform services at the hub as data messages traverse through the hub.

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS link to access external networks through an MPLS provider's network, a wireless cellular link (e.g., a 5G LTE network). In some embodiments, the different physical links between the edge node 342 and the cloud gateway 320 are the same type of links (e.g., are different MPLS links).

In some embodiments, the edge forwarding node 342 also has multiple direct links 350 (e.g., secure connection links established through multiple physical links) to a datacenter hub node 332. Again, the different links in some embodiments can use different types of physical links or the same type of physical links. Also, in some embodiments, the edge forwarding node 342 of the branch site can connect to a SD-WAN router of a vehicle (1) directly through one or more links 350, or (2) through a cloud gateway or datacenter hub to which the edge forwarding node connects through two or more links 350. Hence, in some embodiments, the edge forwarding node 342 of the branch site 340 can use multiple SD-WAN links 350 to reach an SD-WAN router (e.g., 204) of a vehicle (e.g., 300), or a hub forwarding node 332 of a datacenter site 330.

The cloud gateway 320 in some embodiments is used to connect an SD-WAN router of a vehicle (e.g., SD-WAN router 314 of vehicle 310) to an SD-WAN forwarding node (e.g., edge forwarding element 342) through at least two secure connection links 350 between the gateway 320 and the SD-WAN router and between the gateway 320 and the forwarding element at the SD-WAN site (e.g., branch site 340 or datacenter site 330). In some embodiments, the cloud gateway 320 also provides network data from a vehicle to a multi-machine site or from one multi-machine site to another multi-machine site (e.g., provides the accessible subnets of one site to another site). Like the cloud gateway 320, the hub forwarding element 332 of the datacenter 330 in some embodiments can be used to connect an SD-WAN forwarding node 342 of a branch site to an SD-WAN router of a vehicle through at least two secure connection links 350 between the hub 332 and the SD-WAN router and between the hub 332 and the forwarding element at the branch site 340.

In some embodiments, each edge forwarding element, hub, and cloud gateway in an SD-WAN (such as the edge forwarding element 332, the datacenter hub forwarding element 334, and the cloud gateway 320) includes a router that performs the data message forwarding operations of the edge forwarding element, hub forwarding element, or cloud gateway. In such embodiments, the next-hop forwarding records of these edge forwarding elements, hub forwarding elements, and cloud gateways are routing records used by the routers to forward data messages through the SD-WAN.

Each edge forwarding element of an edge site (such as the edge forwarding element 342 of the edge site 340) in some embodiments connects to an external network through two or more forwarding devices (e.g., an MPLS device, a cable modem router, a 5G router) of two or more communication service providers (e.g., a telephone company provider of an MPLS network, a cable modem provider of an Internet Service Provider (ISP), a wireless provider for the 5G connectivity). In some of these embodiments, each edge forwarding element connects to the forwarding devices of the service providers through two or more physical ports of the edge forwarding element.

In some embodiments, each secure connection link between two SD-WAN forwarding nodes (i.e., CGW 320 and edge forwarding node 342) is formed as a virtual private network (VPN) tunnel between the two forwarding nodes. In this example, the collection of the SD-WAN forwarding nodes (e.g., forwarding element 342 and gateways 320) and the secure connections 350 between the forwarding nodes forms a virtual network for a particular entity that spans at least public or private cloud datacenter 325 to connect the branch and datacenter sites 330 and 340.

In some embodiments, secure connection links are defined between gateways in different public cloud datacenters to allow paths through the virtual network to traverse from one public cloud datacenter to another, while no such links are defined in other embodiments. Also, in some embodiments, the gateway 320 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate data message flows that it receives from edge forwarding elements of one entity from data message flows that it receives along other tunnels of other entities. In other embodiments, gateways are single-tenant and are specifically deployed to be used by just one entity.

FIG. 3 illustrates a cluster of managers and controllers 360 that serves as a central point for managing (e.g., defining and modifying) configuration data that is provided to the edge nodes and/or gateways to configure some or all of the operations. In some embodiments, this manager and controller cluster 360 is in one or more public cloud datacenters, while in other embodiments it is in one or more private datacenters. In some embodiments, the manager and controller cluster 360 has a set of manager servers that define and modify the configuration data, and a set of controller servers that distribute the configuration data to the edge FEs, hubs and/or gateways. In some embodiments, the manager and controller cluster 360 facilitates configuration of virtual desktop machines (e.g., virtual desktop VMs) on the vehicles 300 and 310 such that remote users residing at different sites 330 and 340 can access the machines 302 and 312 executing on the vehicles 300 and 310.

Figure 4:
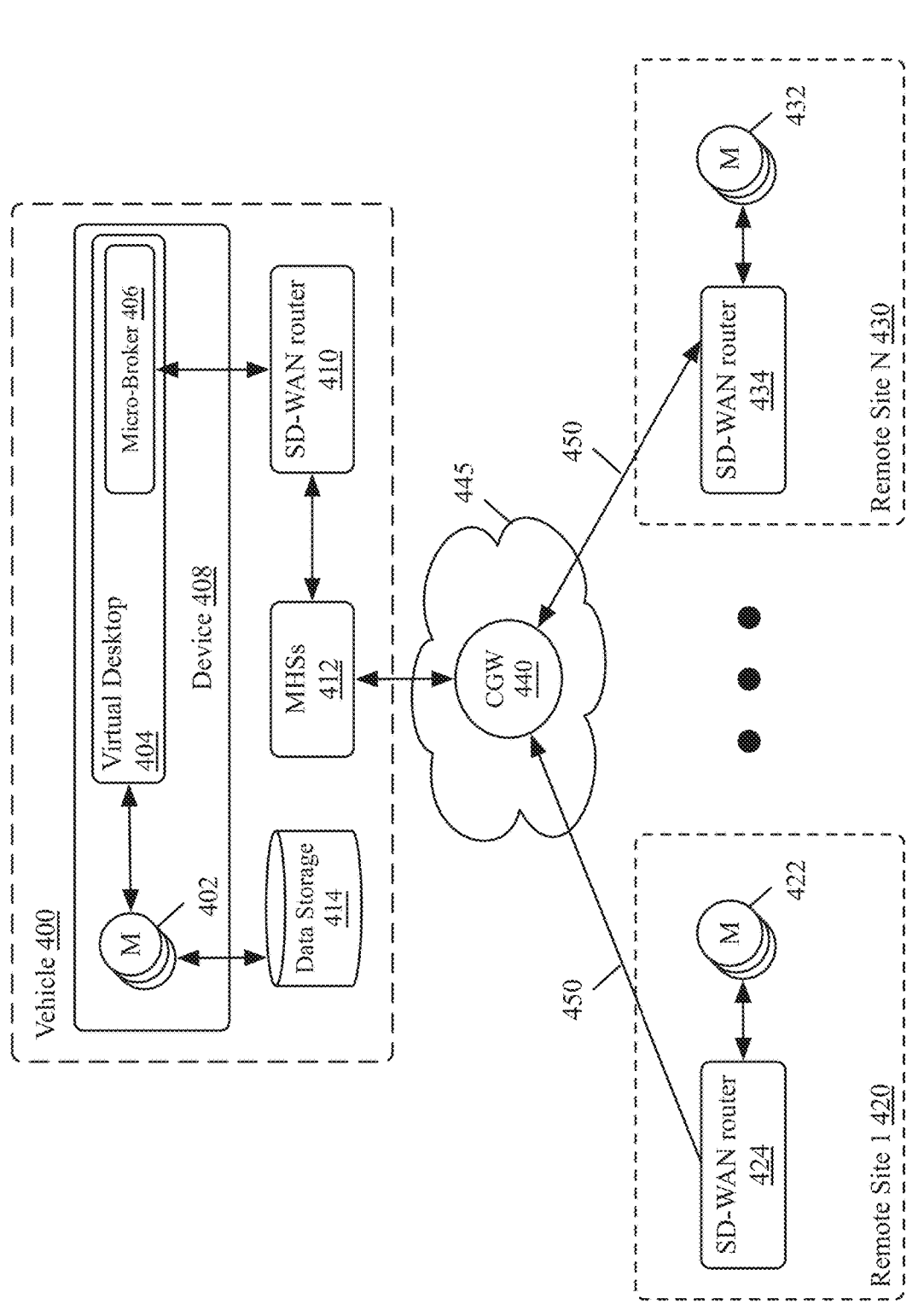
FIG. 4 an example vehicle that allows remote users residing in remote sites to access machines executing in the vehicle over an SD-WAN.

FIG. 4 illustrates an example vehicle 400 that allows remote users residing in a set of remote sites 420 and 430 to access machines 402 executing in the vehicle 400 over an SD-WAN. In this figure, a set of one or more machines 402 and a virtual desktop VM 404 executing a micro-broker 406 execute on a device 408 operating in the vehicle 400. The vehicle 400 also includes an SD-WAN router 410 that uses a set of wireless network connection links 412 to communicate with the remote sites 420 and 430, and a data storage device 414 that stores data collected at the vehicle 400 and analysis results of the collected data. The vehicle 400 can include any number of machines 402 and any number of wireless network connection links 412.

The remote sites 420 and 430 respectively include a set of machines 422 and 432 and an SD-WAN router 424 and 434. The machine sets 422 and 432 in some embodiments execute on one or more devices (e.g., computers) used by remote users residing in the remote sites 420 and 430. The SD-WAN routers 424 and 434 are forwarding elements that exchange data messages with the SD-WAN router 410 in the vehicle 400.

The CGW 440 in some embodiments is a forwarding element that is in a private or public datacenter 445. The CGW #440 in some embodiments has secure connection links (e.g., tunnels) with edge forwarding elements (e.g., SD-WAN routers 424 and 434) at the remote sites 420 and 430. The CGW 440 in some embodiments is used to connect the SD-WAN router 410 of the vehicle 400 to an SD-WAN forwarding node (e.g., SD-WAN routers 424 and 434) through at least two secure connection links 450. In some embodiments, the cloud gateway #440 also provides network data from the vehicle 400 to a remote site or from one remote site to another remote site (e.g., provides the accessible subnets of one site to another site).

Remote users using the machines 422 and 432 operate in some embodiments request, to the micro-broker 406, access to the device's virtual desktop 404. After authenticating a remote user and authorizing their access of the virtual desktop 404, the micro-broker 406 facilitates the interaction between the virtual desktop 404 and the remote user. For example, a particular remote user of the remote site 420 requests access to the virtual desktop 404 for the purpose of analyzing data that was collected at the vehicle 400 and stored in the data storage 414. The remote user wishes to access the virtual desktop 404 over the SD-WAN rather than requesting the collected data be sent to the remote user's device or uploaded to a cloud, for example, because accessing the virtual desktop 404 is more efficient that forwarding or uploading the data.

After the micro-broker 406 receives the access request and authenticates the particular remote user, the particular remote user interacts with the virtual desktop 404 via the micro-broker 406. Then, the particular remote user is able to direct the machines 402 to view and analyze the data stored in the data storage 414 and store the analyzed results in the data storage 414.

Figure 5:
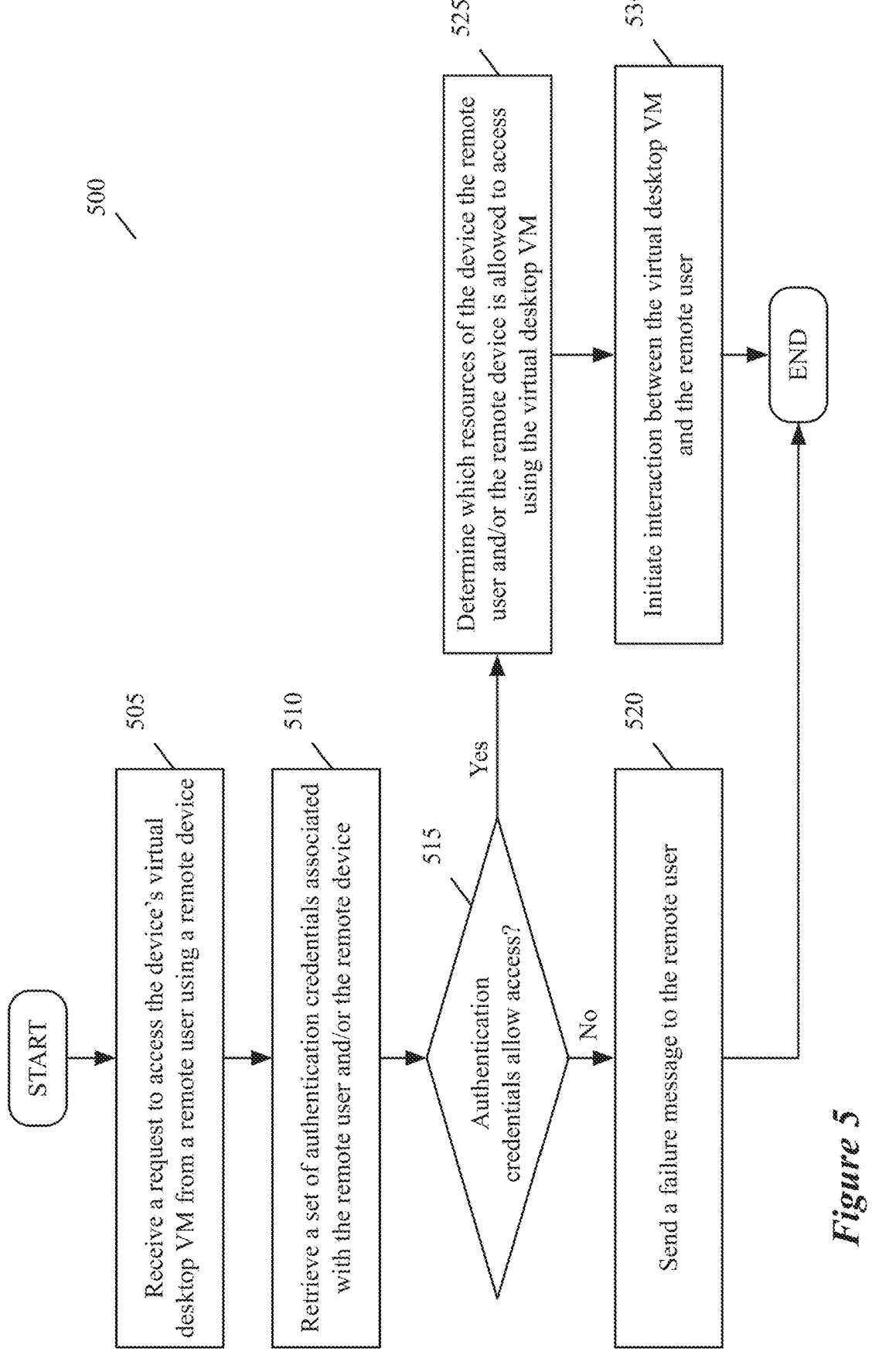
FIG. 5 conceptually illustrates a process of some embodiments for authenticating remote users to allow remote access of a virtual desktop VM executing on a local device operating in a vehicle.

As discussed previously, a micro-broker module is in some embodiments configured within a virtual desktop VM operating on a vehicle device to authenticate remote users before they are allowed to access the virtual desktop VM. FIG. 5 conceptually illustrates a process 500 of some embodiments for authenticating remote users to allow remote access of a virtual desktop VM executing on a local device operating in a vehicle. The process 500 is performed in some embodiments by a micro-broker (e.g., a micro-broker program, application, or module) that executes on the within the virtual desktop VM on the local device (such as the micro-broker 260 of FIG. 2 or the micro-broker 406 of FIG. 4). In some embodiments, the virtual desktop VM and the micro-broker are configured on the local device (e.g., by a hypervisor of the local device) for the purpose of allowing remote access to the local device and the VMs and/or applications that execute on it.

In other embodiments, the process 500 is performed by a connection broker module executing on the local device but not within the virtual desktop VM. The connection broker module in some embodiments authenticates remote users for just the virtual desktop VM, and in other embodiments a set of two or more virtual desktop VMs executing on the local device.

A local device as used herein is a device operating in a vehicle, while a remote device is used herein to describe a device that is not operating in the vehicle or is not a device connected to the vehicle. For example, a remote device is in some embodiments a mobile device that is at the same site as a vehicle, but is not directly connected to the vehicle and its edge router that connects the vehicle to an SD-WAN (e.g., it is a mobile computer of a person in the vehicle). These mobile devices access the vehicle's device using the virtual desktop as well as remote devices operating at different locations than the vehicle.

The process 500 begins by receiving (at 505) a request to access the local device's virtual desktop VM from a remote user using a remote device. The micro-broker receives, from the remote user, a data message requesting to access the virtual desktop VM in order for the remote user to access one or more resources (e.g., VMs, applications, stored data, etc.) associated with the local device. In some embodiments, the request is received as an Application Programming Interface (API) request.

Next, the process 500 retrieves (at 510) a set of authentication credentials associated with the remote user and/or the remote device. In some embodiments, the authentication credentials are included in the request received by the micro-broker in step 505. In such embodiments, the micro-broker extracts the authentication credentials from the received request. In other embodiments, the authentication credentials are not received in the request. In these embodiments, the micro-broker sends a data message (e.g., an API request) to the remote user requesting the authentication credentials, and the remote user provides the requested authentication credentials in a reply data message (e.g., an API reply message). In some embodiments, the micro-broker needs to authenticate the remote user, and the set of authentication credentials includes a username and password associated with the remote user. In these embodiments, unique usernames and passwords are associated with each remote user of the SD-WAN in order to authenticate each remote user for accessing virtual desktops. Conjunctively or alternatively, the micro-broker needs to authenticate the remote device used by the remote user, and the set of authentication credentials include a MAC address and/or an IP address associated with the remote device.

At 515, the process 500 determines whether the set of authentication credentials allow the remote user to access the virtual desktop VM. Using the retrieved set of authentication credentials, the micro-broker authenticates the remote user and/or the remote device. In some embodiments, the micro-broker maintains a data store (e.g., residing on the local device) that includes records of each remote user and/or remote device allowed to access the virtual desktop VM. In embodiments where the set of authentication credentials includes only authentication credentials associated with the remote user, the micro-broker only has to determine whether the remote user is allowed to access the virtual desktop VM. In embodiments where the set of authentication credentials includes only authentication credentials associated with the remote device, the micro-broker only has to determine whether the remote device used by the remote user is allowed to access the virtual desktop VM. In embodiments where the set of authentication credentials includes authentication credentials associated with both the remote user and the remote device, the micro-broker determines whether the remote user and/or the remote device used by the remote user is allowed to access the virtual desktop VM.

If the process 500 determines that the set of authentication credentials do not allow the remote user to access the virtual desktop VM, the process 500 sends (at 520) a failure message to the remote user. When the micro-broker determines that the remote user is not allowed to access the local device, the micro-broker sends a data message (e.g., in an API) to the remote user notifying the remote user that access to the local device's virtual desktop has failed. After sending the failure message to the remote user, the process 500 ends.

If the process 500 determines that the set of authentication credentials allow the remote user to access the virtual desktop VM, the process 500 proceeds to determine (at 525) which resources of the local device the remote user and/or the remote device is allowed to access using the virtual desktop VM. In some embodiments, each remote user and/or each remote device of the SD-WAN is allowed to access a subset of the resources (e.g., VMs, applications, stored data, etc.) associated with the local device through the virtual desktop VM. In such embodiments, the micro-broker maintains a mapping table that maps authentication credentials to a list of resources that are allowed to be accessed by the remote user and/or the remote device associated with the authentication credentials. For example, for a remote user accessing the virtual desktop VM to analyze a set of data collected at the vehicle, the micro-broker in some embodiments determines that the remote user is allowed to access data stored at the vehicle (e.g., on the local device or on a data storage device connected to the local device), a data collection VM, and a data analysis VM. In other embodiments, any authenticated remote user is allowed to access all resources executing on the local device, and the micro-broker does not need to determine which resources are allowed for access.

Lastly, the process 500 initiates (at 530) interaction between the virtual desktop VM and the remote user. The micro-broker in some embodiments is what allows the remote user to communicate with the virtual desktop VM in order to use the resources of the local device. The micro-broker in some embodiments initiates the interaction between the virtual desktop VM and the remote user by sending a session initiation message to the virtual desktop VM, notifying the virtual desktop VM that the remote user is allowed to access it. In some embodiments, the session initiation message also specifies which resources of the local device the remote user is allowed to access.

In some embodiments, the micro-broker sends rendered images of the local device's UI to the remote user, and as the remote user interacts with the rendered image (e.g., through keyboard selections, mouse clicks, etc.), the micro-broker receives notifications of these interactions and translates them to the virtual desktop VM which performs these actions directly on the local device. Further information regarding the interaction between the virtual desktop VM and the remote device as facilitated by the micro-broker will be described below. After initiating the interaction between the virtual desktop VM and the remote user, the process 500 ends.

Figure 6:
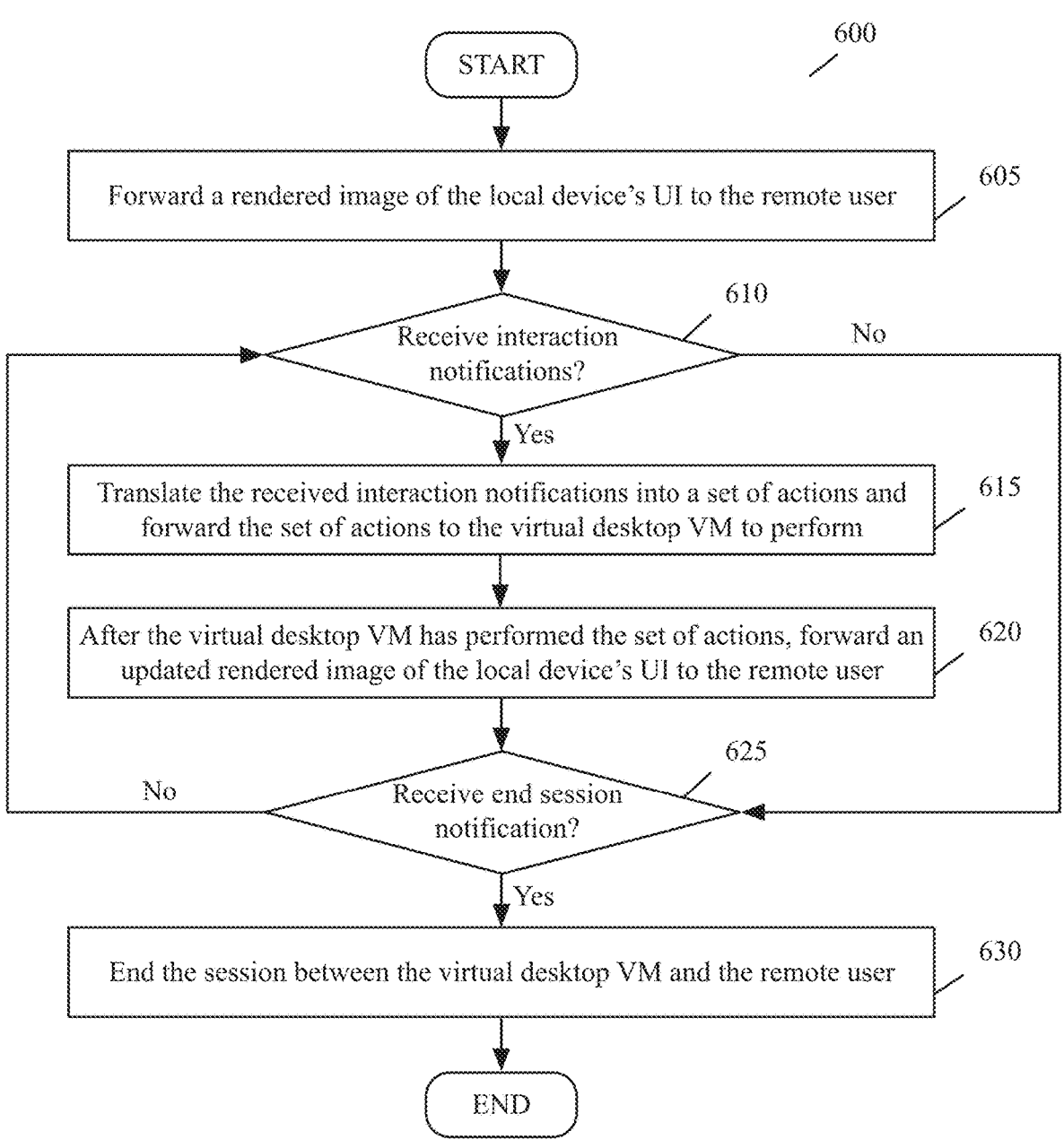
FIG. 6 conceptually illustrates a process of some embodiments for facilitating interaction between a virtual desktop VM executing on a local device in a vehicle and a remote user accessing the virtual desktop VM on a remote device.

FIG. 6 conceptually illustrates a process 600 of some embodiments for facilitating interaction between a virtual desktop VM executing on a local device in a vehicle and a remote user accessing the virtual desktop VM on a remote device. The process 600 is performed in some embodiments by a micro-broker (e.g., a micro-broker program, application, or module) that executes within the virtual desktop VM (such as the micro-broker 260 of FIG. 2 or the micro-broker 406 of FIG. 4). In some embodiments, the process 600 is performed after the micro-broker has authenticated the remote user, allowing the remote user to access the virtual desktop VM and at least a subset of the resources of the local device. The authentication enables the micro-broker to initiate a session of interaction between the remote user and the virtual desktop.

In other embodiments, the process 600 is performed by a connection broker module executing on the local device but not within the virtual desktop VM. The connection broker module in some embodiments authenticates remote users for just the virtual desktop VM, and in other embodiments a set of two or more virtual desktop VMs executing on the local device.

The process 600 begins by forwarding (at 605) a rendered image of the local device's UI to the remote user. In order for the remote user to interact with the local device through the virtual desktop VM, the micro-broker forwards rendered images of the local device's UI for the user to view. In some embodiments, the rendered image is generated by the virtual desktop VM, which forwards it to the connection broker to forward to the remote user. In other embodiments, the rendered image is generated by the micro-broker. The rendered image is in some embodiments forwarded over a wireless network link that connects the vehicle (i.e., an edge router of the vehicle) to an SD-WAN.

Next, the process 600 determines (at 610) whether any interaction notifications have been received from the remote user. As the remote user interacts with the rendered image of the local device's UI (e.g., with keyboard selections, mouse clicks, etc.), the micro-broker receives these interactions from the remote user. If the process 600 determines that no interaction notifications have been received (i.e., the micro-broker has not been notified that the remote user has interacted with the rendered image), the process 600 proceeds to step 625, which will be described below.

If the process 600 determines that one or more interaction notifications have been received (i.e., the micro-broker has been notified that the remote user has interacted with the rendered image), the process 600 translates (at 615) the received interaction notifications into a set of actions and forwards the set of actions to the virtual desktop VM to perform. In some embodiments, to facilitate the interaction between the virtual desktop VM and the remote user, the micro-broker translates the interactions made by the remote user on the rendered image into actual actions for the virtual desktop VM to perform on the local device's VMs. For example, the remote user in some embodiments interacts with the rendered image to view a set of data collected at the vehicle. When the micro-broker receives these interactions, it provides the remote user's actions to the virtual desktop VM, and the virtual desktop VM directs a data collection and analysis VM executing on the local device to show the set of data in the UI.

After the virtual desktop VM has performed the set of actions, the process 600 forwards (at 620) an updated rendered image of the local device's UI to the remote user. In order for the remote user to view the local device's UI as if they are directly interacting with the resources on the local device, the micro-broker forwards an updated rendered image of the local device's UI each time the virtual desktop VM performs a set of actions (as directed by the remote user's interactions with rendered images of the UI).

Next, the process 600 determines (at 625) whether an end session notification has been received from the remote user. In some embodiments, the remote user notifies the micro-broker when they wish to end their session with the virtual desktop VM. If the process 600 determines that an end session notification has not been received, the process 600 returns to step 610 to determine whether interaction notifications have been received.

If the process 600 determines that an end session notification has been received from the remote user, the process 600 ends (at 630) the session between the virtual desktop VM and the remote user. In some embodiments, the micro-broker notifies the virtual desktop VM that the remote user has ended their session, and the micro-broker ends the remote user's access to the virtual desktop VM. After ending the session between the virtual desktop VM and the remote user, the process 600 ends.

Figure 7:
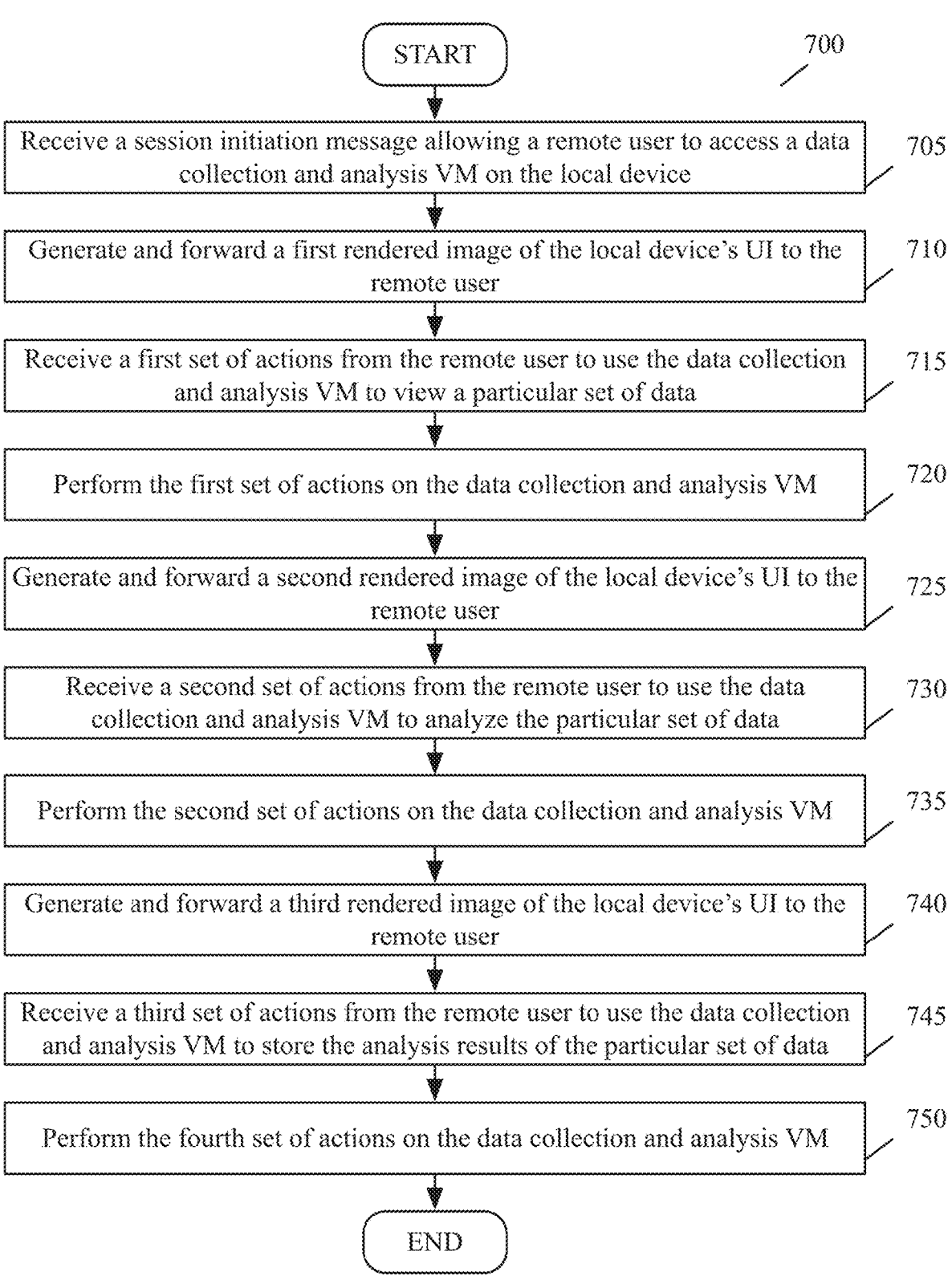
FIG. 7 conceptually illustrates a process of some embodiments for controlling a collection and analysis VM of a local device in a vehicle, as directed by a remote user using a remote device.

As discussed previously, a remote user in some embodiments accesses a virtual desktop VM of a local device in a vehicle in order to view and analyze data collected and stored at the vehicle. FIG. 7 conceptually illustrates a process 700 of some embodiments for controlling a collection and analysis VM of a local device in a vehicle, as directed by a remote user using a remote device. The process 700 is performed in some embodiments by a virtual desktop VM executing on the local device for the purpose of allowing remote use of the local device's VMs (such as the virtual desktop VM 270 of FIG. 2 or the virtual desktop VM 404 of FIG. 4). In some embodiments, the process 700 is performed after the remote user has been authenticated (e.g., by a micro-broker module of the local device) such that the remote user has been authorized to access the virtual desktop VM.

The process 700 begins by receiving (at 705) a session initiation message, allowing the remote user to access a data collection and analysis VM on the local device. The virtual desktop VM in some embodiments receives a notification (e.g., from the micro-broker module of the local device) notifying the virtual desktop VM that the remote user is allowed to access the VM executing on the local device that performs data collection and analysis.

Next, the process 700 generates (at 710) and forwards a first rendered image of the local device's UI to the remote user. In some embodiments, in order for the remote user to view the local device's UI, the virtual desktop VM generates a rendered image of the UI to forward to the remote user over a network (e.g., an SD-WAN). In such embodiments, the rendered image is forwarded to the remote user instead of the data collected at the vehicle because the rendered image is much smaller and will take less time to forward to the remote user's device. The first rendered image shows the local device's UI to the remote user, such that the remote user is able to view the local device's UI and the data collection and analysis VM as if the VM is directly executing on the remote device.

At 715, the process 700 receives a first set of actions from the remote user to use the data collection and analysis VM to view a particular set of data. The virtual desktop VM in some embodiments receives, from the micro-broker module of the local device, a set of actions that the remote user has directed to be performed on the local device. In some embodiments, the virtual desktop VM receives actions to direct the data collection and analysis VM to show a particular set of data that was collected at the vehicle.

Then, the process 700 performs (at 720) the first set of actions on the data collection and analysis VM. In some embodiments, the virtual desktop VM, as directed by the first set of actions, directs the data collection and analysis VM to retrieve the particular set of data from a data storage and show it in the local device's UI. In some embodiments, the particular set of data is stored in a local storage of the local device. In other embodiments, the particular set of data is stored in a data storage device connected to the local device, such as a secure SSD.

After performing the first set of actions on the data collection and analysis VM, the process 700 generates (at 725) and forwards a second rendered image of the local device's UI to the remote user. The second rendered image includes the local device UI after the data collection and analysis VM has shown the particular set of data in the UI. In forwarding the second rendered image that shows the particular set of data, the remote user is able to view the particular set of data without the virtual desktop VM having to actually forward the particular set of data to the remote user.

Next, the process 700 receives (at 730) a second set of actions from the remote user to use the data collection and analysis VM to analyze the particular set of data. This second set of actions is in some embodiments received after the micro-broker module of the local device received interactions notifications from the remote user as the remote user interacted with the second rendered image. At 735, the process 700 performs the second set of actions on the data collection and analysis VM. In some embodiments, the virtual desktop VM, as indicated by the second set of actions, directs the data collection and analysis VM to analyze the particular set of data to produce a set of analysis results.

After performing the second set of actions on the data collection and analysis VM, the process 700 generates (at 740) and forwards a third rendered image of the local device's UI to the remote user. The third rendered image includes the local device UI after the data collection and analysis VM has analyzed the particular set of data and shown the analysis results in the UI. In forwarding the third rendered image that shows the analysis results, the remote user is able to view the analysis results without the virtual desktop VM having to actually forward the analysis results to the remote user.

Next, the process 700 receives (at 745) a third set of actions from the remote user to use the data collection and analysis to store the analysis results of the particular set of data. This third set of actions is in some embodiments received after the micro-broker module of the local device received interactions notifications from the remote user as the remote user interacted with the third rendered image.

Lastly, the process 700 performs (at 750) the third set of actions on the data collection and analysis VM. After the virtual desktop VM has been directed by the remote user to store the analysis results, the virtual desktop VM directs the data collection and analysis VM to store the analysis results. In embodiments where the particular set of data is stored on the local device, the virtual desktop VM directs the data collection and analysis VM to store the analysis results also on the local device. In embodiments where the particular set of data is stored on a data storage device connected to the local device, the virtual desktop VM directs the data collection and analysis VM to store the analysis results on the data storage device. After performing the third set of actions on the data collection and analysis VM, the process 700 ends.

By allowing the remote user to access the local device through the virtual desktop VM, the remote user is able to view and analyze data that is stored at the vehicle without having to actually forward the data to the remote user. This allows for data intensive operations to take place on the virtual desktop more quickly than if the data were to be forwarded to remote devices. By instantiating a virtual desktop VM on a device in a vehicle, users local to the vehicle and remote users residing in different locations than the vehicle can remotely access the vehicle's device and use the device's virtual desktop to immediately access and operate on any large dataset that is collected and stored at the vehicle's hypervisor or on the virtual desktop's virtual disks. This allows for software, such as forensic analysis software, to immediately operate on the collective data and be operated by a remote expert with the special knowledge and skill in the operation of such software beyond the abilities of the local in-vehicle personnel.

Figure 8:
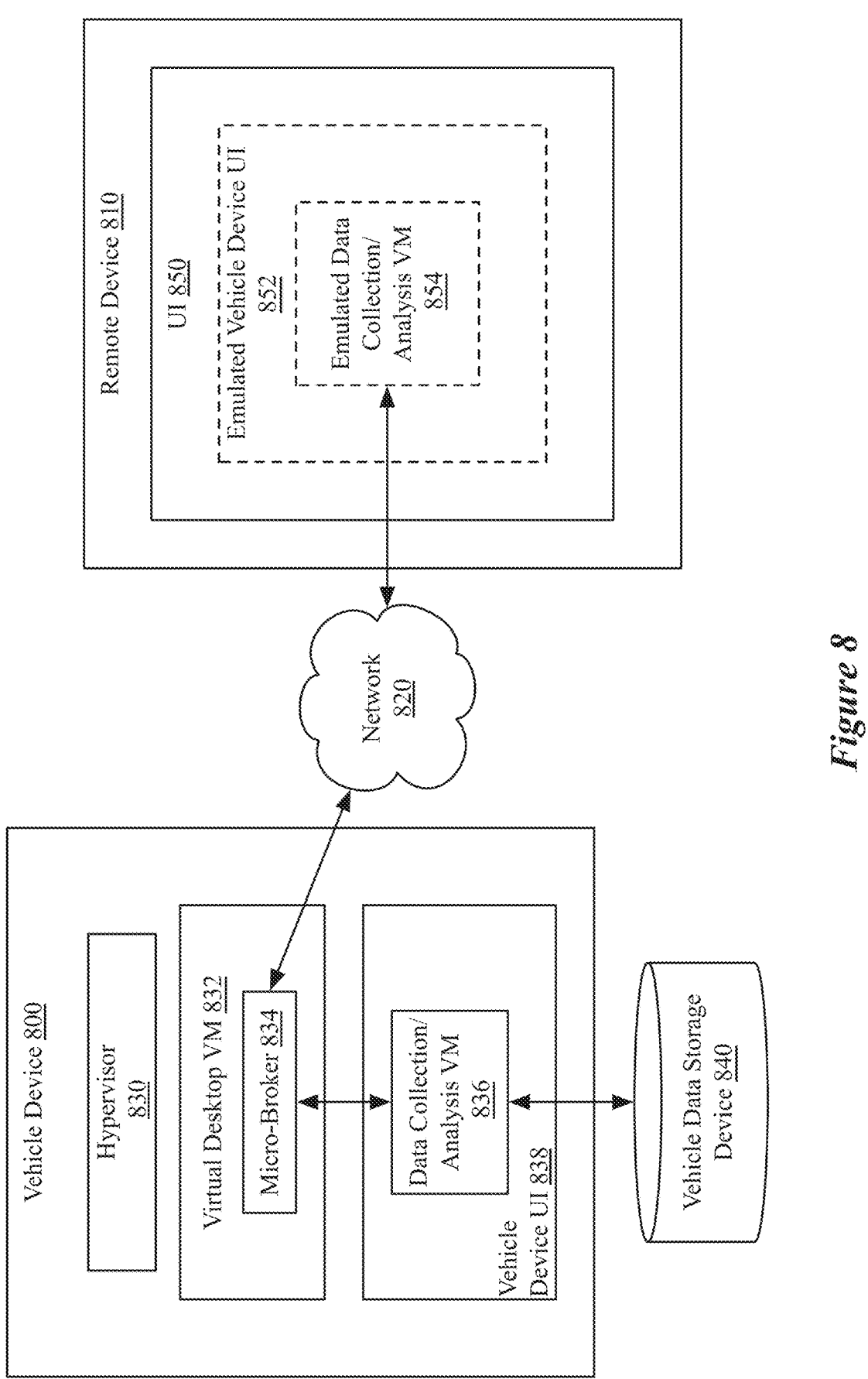
FIG. 8 illustrates an example vehicle device that is accessed by a remote device over a network.

FIG. 8 illustrates an example vehicle device 800 that is accessed by a remote device 810 over a network 820. In this example, the vehicle device 800 includes a hypervisor 830, a virtual desktop VM 832 executing a micro-broker 834, a data collection and analysis VM 836, and a UI 838. The hypervisor 830 in some embodiments configures the virtual desktop VM 832, micro-broker 834, and data collection and analysis VM 836, and performs operations similar to the hypervisor 250 described in FIG. 2. The vehicle 800 in some embodiments connects to an edge router (not shown) in the vehicle in order to communicate with the remote device 810 over the network 820. In some embodiments, the remote device connects to a different edge router (not shown) to communicate with the vehicle device 800 over the network 820. In other embodiments, the remote device 810 includes a software edge forwarding element (e.g., a software edge router or gateway) (not shown) to communicate with the vehicle device 800 over the network 820.

The virtual desktop VM 832 is configured on the vehicle device 800 to provide remote use of the data collection and analysis VM 836, which is facilitated by the micro-broker 834. While one data collection and analysis VM 836 is illustrated in this figure, one of ordinary skill would understand that any number of VMs may execute on the vehicle device 800 for performing data collection and analysis. While a micro-broker 834 is illustrated as operating within the virtual desktop VM 832 in this figure, one of ordinary skill would understand that a connection broker module may instead execute on the vehicle device 800 for facilitating interactions between the virtual desktop VM 832 and the remote device 810.

The vehicle device UI 838 executes on the vehicle device 800 to enable local users (i.e., users of the vehicle) to use the data collection and analysis VM 836. In some embodiments, a user of the vehicle use the data collection and analysis VM 836, through the UI 838, to collect data at the vehicle's location. Data collected at the vehicle is stored in a data storage device 840 located in the vehicle and connected to the vehicle device 800. In some embodiments, the data storage device 840 is a secure SSD. Further information of a secure SSD will be described below.

The remote device 810, when authenticated by the micro-broker 834, interacts with the virtual desktop VM 832 in order to remotely use the data collection and analysis VM 836. In some embodiments, the remote device's UI 850 presents an emulated vehicle device UI 852 and an emulated data collection and analysis VM 854. The emulated vehicle device UI 852 is a rendered image of the vehicle device UI 838 forwarded over the network 820 to the remote device 810. The emulated data collection and analysis VM 854 is a rendered image of the data collection and analysis VM 836 as it is shown in the vehicle device UI 838. Using these rendered images of the vehicle device UI 838 and the data collection and analysis VM 836, the user of the remote device 810 interacts with the emulated vehicle device UI 852 and the emulated data collection and analysis VM 854 to remotely control the vehicle device UI 838 and data collection and analysis VM 836.

Because of the virtual desktop VM 832 micro-connection broker 834 instantiated on the vehicle device 800, from the remote user's perspective, their remote device 810 displays the UI 838 and the VM 836 of the vehicle's device 800 and allows them to control the UI 838 and VM 836. By controlling the UI 838 and VM 836 remotely, the remote user is able to remotely view and analyze data stored in the data storage device 840 without needing to actually forward the data to the remote device 810 over the network 820.

Figure 9:
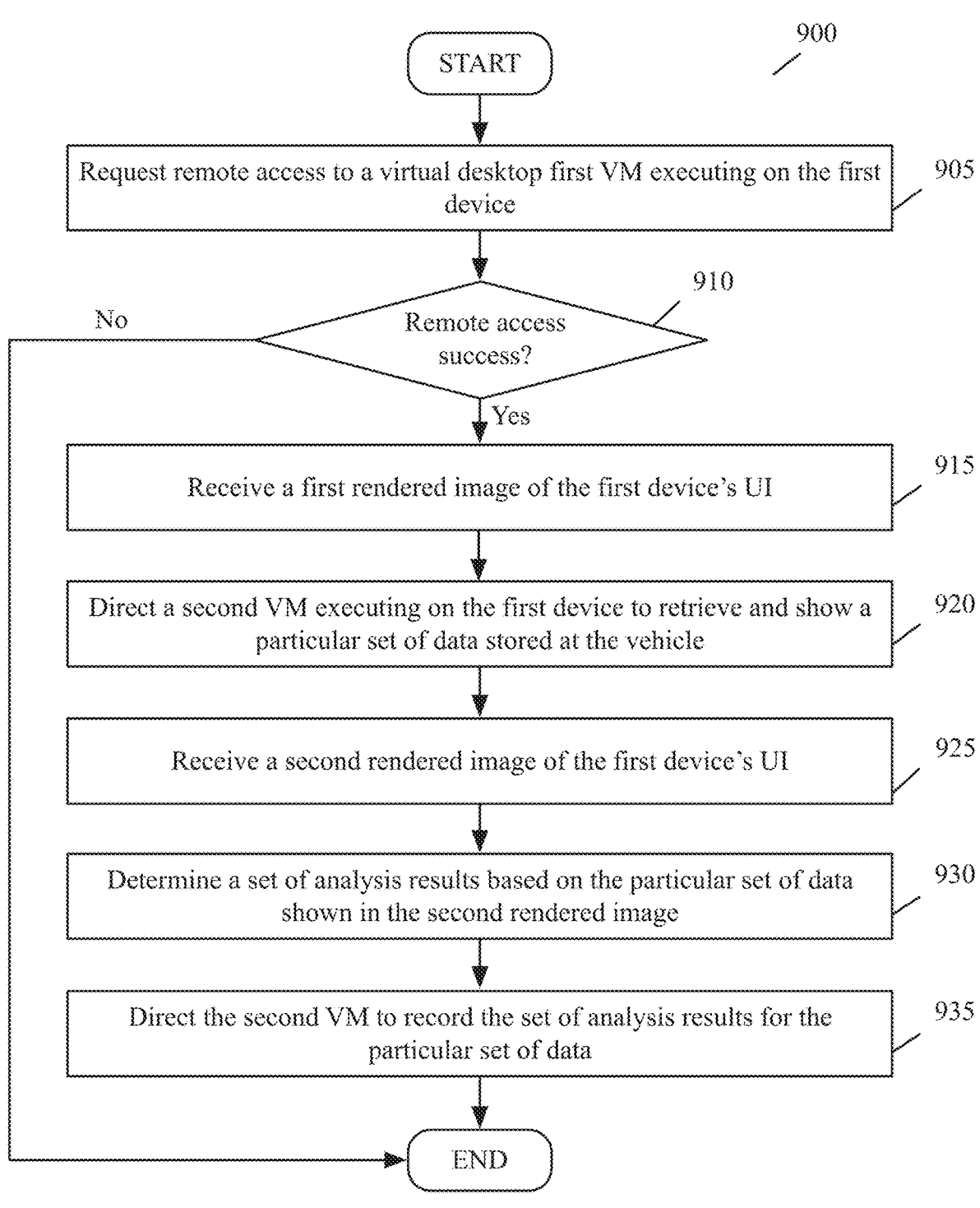
FIG. 9 conceptually illustrates a process of some embodiments for remotely performing data analysis on a set of data collected using a first device operating in a vehicle at a first location.

FIG. 9 conceptually illustrates a process 900 of some embodiments for remotely performing data analysis on a set of data collected using a first device operating in a vehicle at a first location. The process 900 is performed in some embodiments by a remote second device over a network (such as the remote device 810 of FIG. 8). In some embodiments, the remote device resides in the first location along with the vehicle. In other embodiments, the remote device resides in a remote second location. The network is in some embodiments an SD-WAN that connects the first device to the remote second device.

In some embodiments, this connection is enabled using a set of wireless network links of an edge router executing in the vehicle. The wireless network links may be provided by any number of cellular providers. The edge router may be an edge router appliance, an edge router that executes on a computer operating in the vehicle (such as the first device), or an edge router that executes on a machines executing on a computer in the vehicle. The remote second device in some embodiments resides in a remote location (e.g., at a branch site of the SD-WAN) and includes a software forwarding element (e.g., a software router or gateway) that connects to the SD-WAN. In other embodiments, the remote second device resides in a branch site of the SD-WAN that includes an edge router to connect the remote second device to the SD-WAN.

The process 900 begins by requesting (at 905) remote access to a virtual desktop VM executing on the first device. The remote second device in some embodiments sends a data message (e.g., an API request) to a micro-broker module configured within the virtual desktop VM to authenticate remote users before they are allowed to access the virtual desktop VM. Alternatively, the remote second device in other embodiments sends the data message to a connection broker module configured on the first device. In some embodiments, the request data message includes a set of authentication credentials for the micro or connection broker module to authenticate the remote user and/or the remote second device. For example, the set of authentication credentials in some embodiments includes a username and password of the remote user. The set of authentication credentials conjunctively or alternatively in other embodiments includes a MAC address and/or an IP address associated with the remote second device.

Next, the process 900 determines (at 910) whether remote access of the virtual desktop VM is successful. The remote second device determines in some embodiments whether it has received a remote access success message or a remote access failure message from the micro or connection broker module. In some embodiments, the micro or connection broker module notifies the remote second device in a data message (e.g., in an API message) whether the set of authentication credentials received for the remote user and/or the remote second device has been successfully authenticated for remote use of the virtual desktop VM.

If the process 900 determines that remote access of the virtual desktop VM was not successful (i.e., that the remote second device has received a remote access failure message from the micro or connection broker module), the process 900 ends. If the process 900 determines that remote access of the virtual desktop VM was successful (i.e., that the remote second device has received a remote access success message from the micro or connection broker module), the process 900 proceeds to receive (at 915) a first rendered image of the first device's UI. In some embodiments, the remote second device receives, from the micro or connection broker module, a first rendered image of the first device UI in order for the remote user to view a data collection and analysis second VM on the first device. The first rendered image is generated in some embodiments by the virtual desktop VM and in other embodiments by the micro or connection broker module.

Next, the process 900 directs (at 920) the data collection and analysis second VM executing on the first device to retrieve and show a particular set of data stored at the vehicle. In some embodiments, on the remote second device, the remote user interacts with the first rendered image, e.g., using keyboard selections and mouse clicks. In such embodiments, these interactions are forwarded to the micro or connection broker module, and the micro or connection broker module translates them into actions for the virtual desktop VM to perform on the first device's UI. In interacting with the first rendered image, the remote second device directs the second VM to retrieve and show the particular set of data.

At 925, the process 900 receives a second rendered image of the first device's UI. After the virtual desktop first VM received the actions to perform on the first device's UI (per the remote user's interactions with the first rendered image), the virtual desktop VM directs the data collection and analysis second VM to retrieve and display the particular set of data in the first device's UI. In some embodiments, the data collection and analysis second VM retrieves the particular set of data from a local data store on the first device. In other embodiments, the data collection and analysis second VM retrieves the particular set of data from a data storage device (e.g., a secure SSD) that resides in the vehicle and is connected to the first device.

The second rendered image in some embodiments shows the particular set of data such that the remote user is able to view the particular set of data. Then, the process 900 determines (at 930) a set of analysis results based on the particular set of data shown in the second rendered image. In some embodiments, the remote user is able to view the particular set of data and determine the set of analysis results just based on the viewing. For example, the particular set of data shown is in some embodiments a photo of evidence that was taken at the first location, and the remote user determines the analysis results of the photo by determining what is shown in the photo. In other embodiments, the remote user, using the remote device, directs the virtual desktop first VM to (1) direct the data collection and analysis second VM to analyze the particular set of data to produce the set of analysis results, (2) generate a third rendered image showing the analysis results, and (3) forward the third rendered image to the remote second device.

Lastly, the process 900 directs (at 935) the data collection and analysis second VM to record the set of analysis results for the particular set of data. In embodiments where the remote user directly produces the set of analysis results, the remote second device forwards the set of analysis results to the first device for the data collection and analysis second VM to record in the same data storage that stores the particular set of data (i.e., a local storage of the first device or a storage device of the vehicle). Conjunctively or alternatively, the remote second device stores the set of analysis results in a storage local to the remote second device, such as in a data store of the remote second device or in a data storage device connected to the remote second device.

In embodiments where the remote second device directs the data collection and analysis second VM to produce the set of analysis results, the remote second device interacts with the third rendered image to direct the data collection and analysis second VM to store the set of analysis results in the same data storage that stores the particular set of data (i.e., a local storage of the first device or a storage device of the vehicle). After the set of analysis results is stored, the process 900 ends.

Figure 10:
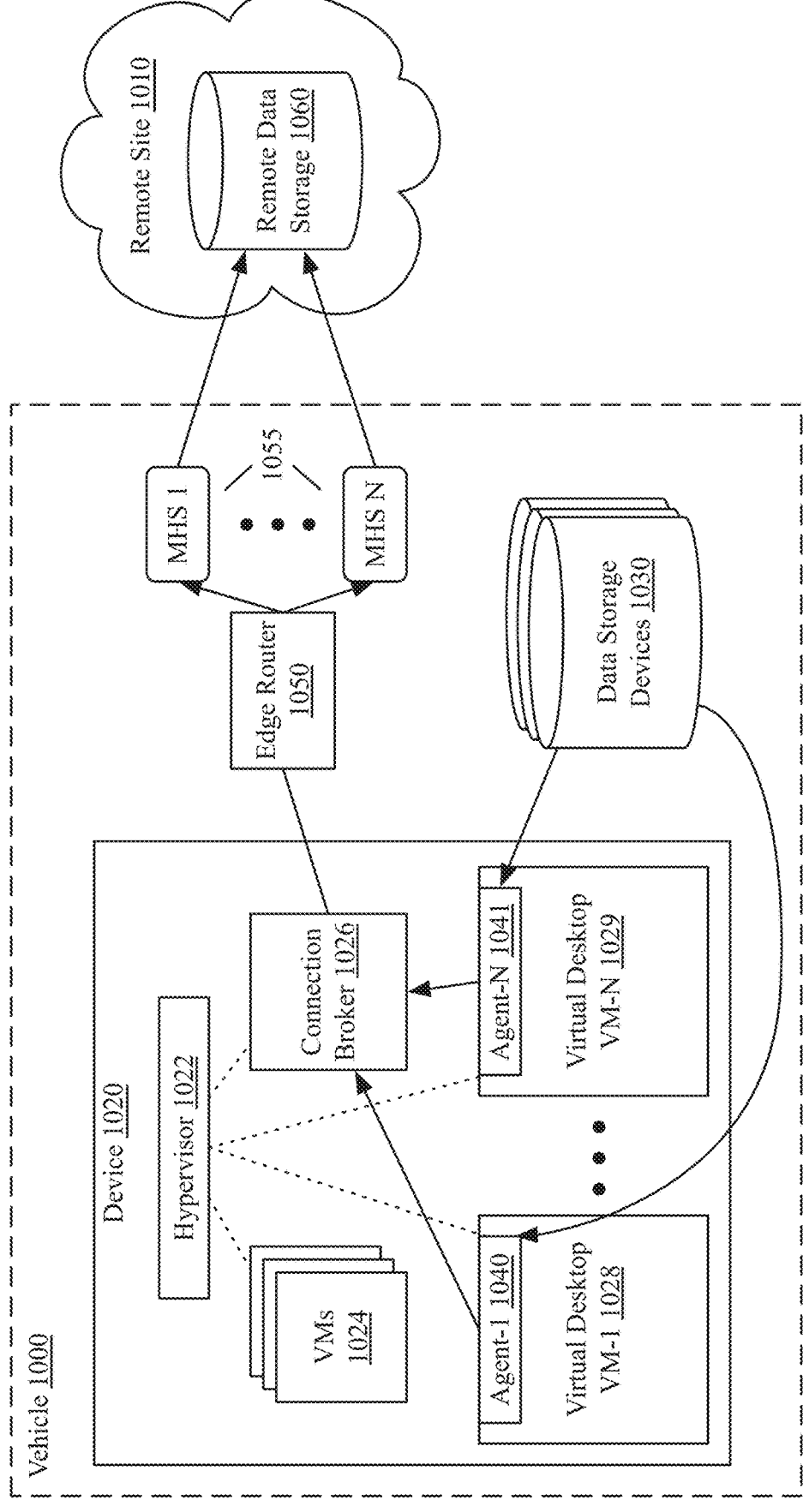
FIG. 10 illustrates a vehicle that collects data and stores data both at the vehicle and at a remote site.

In some embodiments, in order to ensure that data collected and stored at a vehicle is not lost, the data and all data collection and analyzation operations are replicated to a different location, such as a remote datacenter, a cloud site, or a central data repository. FIG. 10 illustrates a vehicle 1000 that collects data and stores data both at the vehicle 1000 and at a remote site 1010.

The vehicle 1000 includes a device 1020 that executes a hypervisor 1022, a set of VMs 1024, a connection broker 1026, and a set of one or more virtual desktop VMs 1028-1029. The hypervisor 1022 configures each the components of the device 1020 (similarly to the hypervisor 250 of FIG. 2). The set of VMs 1024 includes one or more VMs for performing various operations, such as data collection and data analysis. The virtual desktop VMs 1028-1029 execute on the device 1020 to provide remote access to the device 1022 and the VMs 1024. The connection broker 1026 facilitates the interaction between the virtual desktop VMs 1028-1029 and remote devices (similarly to the connection broker 260 of FIG. 2). In other embodiments, rather than executing one connection broker 1026 for the set of virtual desktop VMs 1028-1029, a different micro-broker module executes within each virtual desktop VM 1028-1029 for facilitating the interaction between its virtual desktop VM and remote devices.

The vehicle 1010 also includes a set of one or more data storage devices 1030 that store data collected at the vehicle 1020. In some embodiments, data analysis results that are produced from the collected data are also stored on the data storage devices 1030. For example, a remote user accessing the VMs 1024 through one of the virtual desktop VMs 1028-1029 in some embodiments analyzes a set of collected data and directs one or more of the VMs 1024 to store the analysis results on the data storage devices 1030. In some embodiments, collected data and analysis results are stored on different data storage devices 1030. In other embodiments, collected data and their associated analysis results are stored on a same storage device 1030.

The virtual desktop VMs 1028-1029 are each configured (by the hypervisor 1022 in some embodiments) with a synchronization agent #1040-1041. The synchronization agents 1040-1041 run within the virtual desktop VMs 1028-1029 to replicate all data, data collection and analysis operations, and analysis results taken place at the vehicle 1010 to the remote site. In such embodiments, an agent 1040 copies all of the data and analysis results stored on the data storage devices 1030, and forward them to the connection broker 1026. The connection broker 1026 provides all of this information to an edge router 1050 of the vehicle, which forwards it along one or more wireless network links 1055 to a remote data storage 1060 residing at the remote site 1010.

In some embodiments, the remote site 1010 is a cloud site, and the remote data storage 1060 is a cloud data storage. In other embodiments, the remote site 1010 is a remote data-center site, and the remote data storage 1060 is a data storage residing at the datacenter site. By replicating all of the data and analysis results from the data storage devices 1030 in the vehicle 1030 to the remote data storage 1060, the synchronization agents 1040-1041 ensure that there is a copy of all of the vehicle's collected and analyzed data at a secure location.

Figure 11:
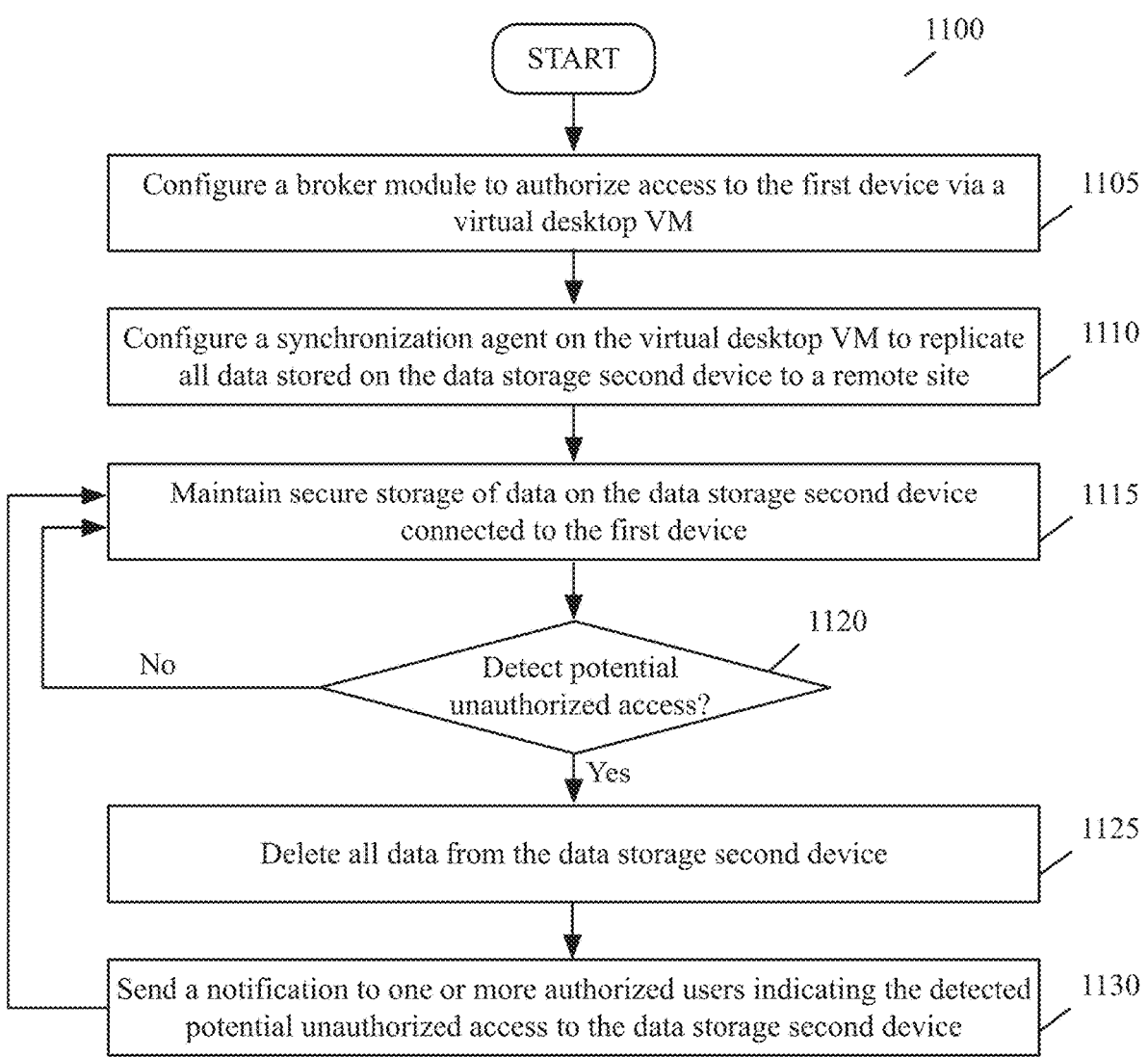
FIG. 11 conceptually illustrates a process of some embodiments for securely storing data and analysis results in a vehicle.

In some embodiments, because data collected at a vehicle is able to be remotely accessed through a virtual desktop VM, some embodiments store data at the vehicle on a secure SSD in order to prevent unauthorized users from accessing the data. FIG. 11 conceptually illustrates a process 1100 of some embodiments for securely storing data and analysis results in a vehicle. The process 1100 is performed in some embodiments by a hypervisor of a first device that (1) executes a virtual desktop VM for remote use of the first device and (2) connects to a data storage second device in the vehicle (such as the hypervisor 250 of FIG. 2, the hypervisor 830 of FIG. 8, or the hypervisor 1022 of FIG. 10).

The process 1100 begins by configuring (at 1105) a broker module to authorize access to the first device via a virtual desktop VM instantiated on the first device. Similarly to steps 115 and 120 of FIG. 1, the hypervisor in some embodiments configures a micro-broker software, module, or application on the virtual desktop VM to authenticate remote users for accessing the virtual desktop VM and facilitate the interaction between authorized remote users and the virtual desktop VM. In other embodiments, the hypervisor configures a connection broker module on the first device to authenticate remote users for according the virtual desktop VM.

Next, the process 1100 configures (at 1110) a synchronization agent on the virtual desktop VM to replicate all data stored on the data storage second device to a remote site. In order to ensure that all data stored at the vehicle is not lost, the hypervisor in some embodiments configures a synchronization agent (such as one of the synchronization agents 1028-1029 of FIG. 10) to replicate all data and analysis results stored at the vehicle to a remote data storage residing at a remote site. In some embodiments, the remote site is a cloud site. In other embodiments, the remote site is a cloud site.

At 1115, the process 1100 maintains secure storage of data on the data storage second device connected to the first device in the vehicle. In some embodiments, the data storage second device is a secure SSD in order to more securely store data that is collected at the vehicle and analysis results of the collected data. At 1120, the process 1100 determines whether potential unauthorized access to the data storage second device has been detected. The hypervisor in some embodiments monitors the data storage second device to detect when unauthorized remote users are accessing the data stored on the second device. In some embodiments, the hypervisor communicates with the broker module to determine whether all remote users currently accessing any of the first device's VMs (i.e., through the virtual desktop VM) have been authenticated by the broker module.

If the process 1100 determines that potential unauthorized access of the data storage second device has not been detected, the process 100 returns to step 1115 to continue maintaining secure storage of the data on the data storage second device. If the process 1100 determines that potential unauthorized access of the data storage second device has been detected, the process 1100 deletes (at 1125) all data from the data storage second device. In order to prevent unauthorized remote users from accessing the data collected at the vehicle, the hypervisor deletes all of the data stored on the data storage second device when the hypervisor detects that potential unauthorized access of the data has occurred. However, the data is not completely lost because the hypervisor has already configured a synchronization agent to replicate the data from the data storage second device to the remote site. Because the hypervisor in some embodiments replicates all of the data stored at the vehicle to the remote site, the hypervisor can delete all of the data stored at the vehicle to prevent unauthorized access of it without completely losing the data.

Lastly, the process 1100 sends (at 1130) a notification to one or more authorized users of the first device, indicating the detected potential unauthorized access to the data storage second device. In some embodiments, the hypervisor directs the broker module, which maintains a list of authorized users of the first device (e.g., to use to authenticate remote users), to send the notification to all authorized users of the first device. Conjunctively or alternatively, the hypervisor presents, in a UI of the first device, the notification of the detected potential unauthorized access to local users of the vehicle.

This notification is to notify all authorized users of the detected potential unauthorized access to the data storage second device, so the authorized users can take actions to mitigate the potential unauthorized access. After sending the notification, the process 1100 returns to step 1115 to continue maintaining secure storage of the data on the data storage second device. In some embodiments, the process

1100 is performed indefinitely. In other embodiments, the process 1100 ends, e.g., when the vehicle (and subsequently the hypervisor) is powered down.

By using an in-vehicle virtual desktop to collect and analyze data, some embodiments allow for remote interactions with locally collected datasets. The use of a virtual desktop along with an SD-WAN ensures reliable remote access to data with adequate bandwidth, resulting in a good user experience but to a multi-carrier multi-LTE configuration. This ensures in some embodiments coverage with sufficient multi-connection spanning bandwidth wherever the vehicle is located, and even if the vehicle is in motion traversing unanticipated areas where one or more carriers have weak signals. Without connecting a vehicle to an SD-WAN using multi-carrier wireless network links, some embodiments experience a highly unreliable user experience, due to the coverage and bandwidth challenges that single carrier and single connection embodiments would impose.

In some embodiments, a device operating in a vehicle that uses a virtual desktop for remote use is connected to a secure SSD for storing data collected at the vehicle. In such embodiments, the remotely accessed device is able to securely store sensitive data (e.g., forensic data collected by police vehicles) at the vehicle, while still protecting the sensitive data from unauthorized access. Additionally, some embodiments instantiate a synchronization agent within a virtual desktop VM that replicates data collection and analysis operations to a designated remote datacenter, cloud site, or central data repository of the SD-WAN. This ensures that the data collected and analyzed at the vehicle is not lost.

A device in a vehicle that executes a virtual desktop is in some embodiments a mobile device that is able to be removed from the vehicle and taken to other locations. For example, when data needs to be collected for a crime scene, a mobile device is in some embodiments removed from the vehicle to collect the data. After the data has been collected, the mobile device and the data it collected is able to be remotely accessed because the virtual desktop is instantiated on the mobile device.

In some embodiments, when a remote user is accessing a device in a vehicle, the device will shut down when the vehicle is shut down. In such embodiments, the hypervisor of the device detects when the vehicle is being shut down (i.e., being powered down by a user of the vehicle), and notifies the remote user to save their work before it is lost when the device powers down. In receiving this message from the hypervisor, the remote user in some embodiments sees a countdown application on their UI displaying the virtual desktop of the vehicle device, which lets the remote user know how much time they have to save their work before they will lose access to the vehicle device. By performing data collection and analysis as described above, remote users are able to interact with collected data at the "mobile edge" of a network. Specifically, they have immediate access to collected data, while storing it securely against threats and synchronizing it to a safe remote location, leveraging the speed and reliability of wireless network links of an SD-WAN.

While the above embodiments have been described in relation to collection and analysis of data, and for vehicles that collect data that needs to be analyzed (such as police vehicles and first responder vehicles), one of ordinary skill would understand that any type of vehicle may deploy a device that executes a virtual desktop VM for remote access to any type of VM or application.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
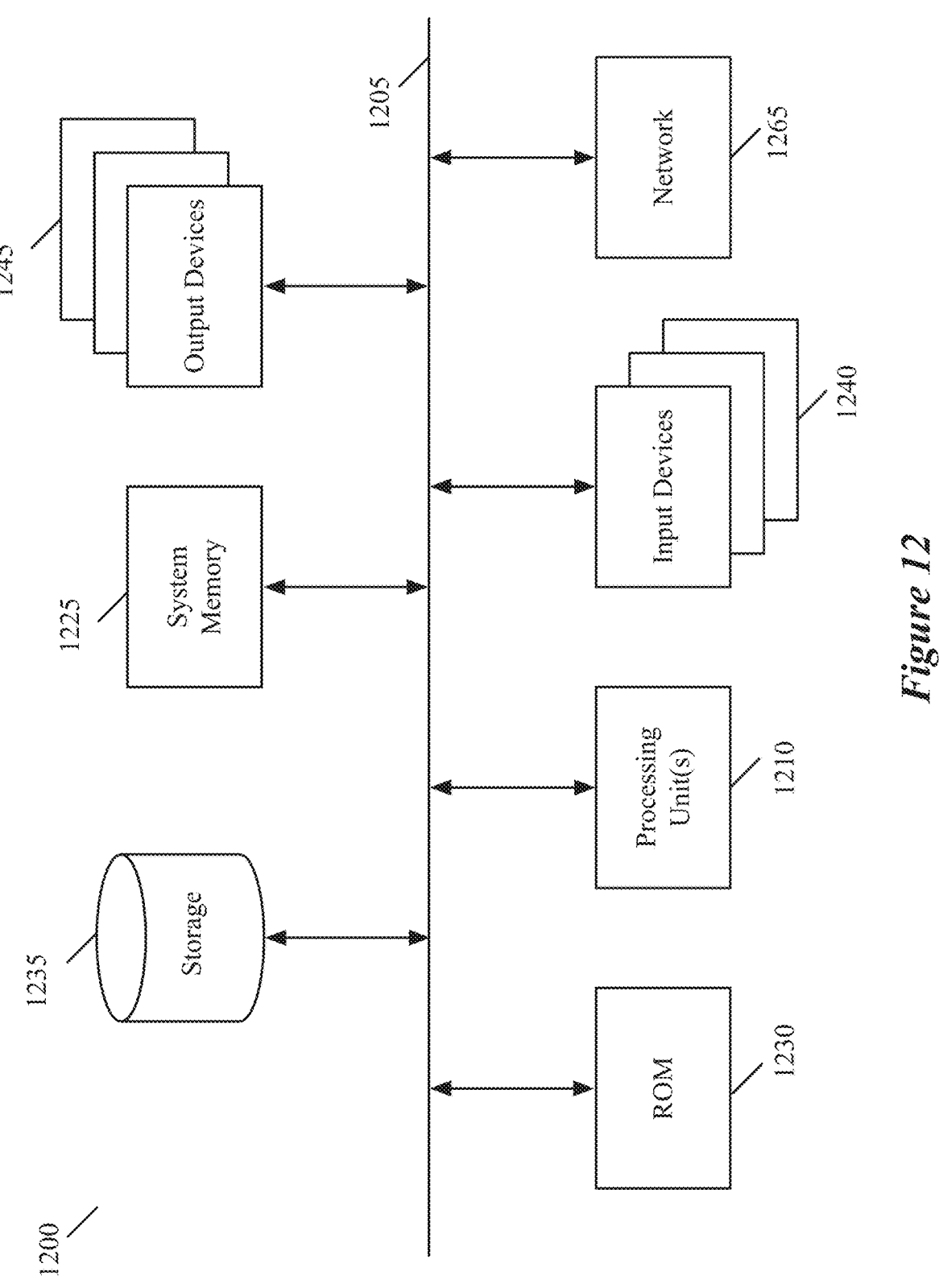
FIG. 12 conceptually illustrates an electronic system with which some embodiments of the invention are implemented.

FIG. 12 conceptually illustrates a computer system 1200 with which some embodiments of the invention are implemented. The computer system 1200 can be used to implement any of the above-described computers and servers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for analyzing data collected by a vehicle at a first location, the method comprising:

on a first device operating in the vehicle:

instantiating a virtual desktop first virtual machine (VM), the virtual desktop first VM for allowing remote use of the first device by a remote user that uses a remote second device at a remote second location;

instantiating a data collection second VM, the data collection second VM for local use of the first device to collect a set of data at the first location and store the set of data at the vehicle; and facilitating interaction between the virtual desktop first VM and the remote user over a network for the remote user to access the data collection second VM to analyze the set of data without needing to forward the set of data over the network to the remote second device;

wherein the virtual desktop VM is a first virtual desktop VM, the method further comprising instantiating a set of two or more virtual desktop VMs including the first virtual desktop VM, wherein each virtual desktop VM is associated with a different remote user such that no two remote users access a same virtual desktop VM.

2. The method of claim 1, wherein facilitating the interaction between the virtual desktop VM and the remote user comprises configuring a micro-broker module within the virtual desktop VM to authenticate the remote user and facilitate the interaction between the virtual desktop VM and the remote user.

3. The method of claim 2, wherein configuring the micro-broker module to authenticate the remote user comprises configuring the micro-broker module to authenticate a set of user authentication credentials associated with the remote user.

4. The method of claim 3, wherein the set of user authentication credentials comprises a username and a password associated with the remote user.

5. The method of claim 3, wherein configuring the micro-broker module to authenticate the remote user further comprises configuring the micro-broker module to authenticate a set of device authentication credentials associated with the remote second device.

6. The method of claim 5, wherein the set of device authentication credentials comprises at least one of a Media Access Control (MAC) address and an Internet Protocol (IP) address of the remote second device.

7. The method of claim 2, wherein configuring the micro-broker module to authenticate the remote user comprises configuring the micro-broker module with a set of rules indicating which resources on the first device the remote user is allowed to access.

8. The method of claim 7, wherein the resources on the first device the remote user is authorized to access comprises a set of one or more data collection and analysis VMs.

9. The method of claim 1, wherein facilitating the interaction between the virtual desktop VM and the remote user comprises configuring a connection broker module on the first device to authenticate the remote user and facilitate the interaction between the virtual desktop VM and the remote user.

10. The method of claim 1, wherein the data stored at the vehicle is stored on the first device.

11. The method of claim 1, wherein the data stored at the vehicle is stored on a particular storage device connected to the first device.

12. The method of claim 11, wherein the particular storage device is a secure solid-state drive (SSD).

13. The method of claim 11 further comprising configuring a synchronization agent on the virtual desktop VM to replicate the data stored on the secure SSD to a remote data storage.

14. The method of claim 12 further comprising:

detecting potential unauthorized access to the secure SSD; and deleting the data stored on the secure SSD.

15. The method of claim 14, wherein the remote user is a first remote user, and detecting potential unauthorized access to the secure SSD comprises detecting unauthorized access to the virtual desktop VM by a second remote user using a remote third device.

16. The method of claim 1, wherein the network is a software-defined wide area network (SD-WAN) and the remote user interacts with the virtual desktop VM using a set of one or more wireless network links associated with an edge router in the vehicle that connects the vehicle to the SD-WAN.

17. The method of claim 16, wherein the set of wireless network links comprises at least two wireless network links provided by at least two different service providers.

18. The method of claim 16, wherein the edge router is one of (i) an edge router appliance, (ii) an edge router that executes on a computer that operates in the vehicle, or (iii) an edge router that executes on a machine that executes on the computer.

19. A non-transitory machine readable medium storing a program for execution by at least one processing unit of a first device operating in a vehicle for analyzing data collected by the vehicle at a first location, the program comprising sets of instructions for:

instantiating a virtual desktop first virtual machine (VM), the virtual desktop first VM for allowing remote use of the first device by a remote user that uses a remote second device at a remote second location;

instantiating a data collection second VM, the data collection second VM for local use of the first device to collect a set of data at the first location and store the set of data at the vehicle; and facilitating interaction between the virtual desktop first VM and the remote user over a network for the remote user to access the data collection second VM to analyze the set of data without needing to forward the set of data over the network to the remote second device;

wherein the virtual desktop VM is a first virtual desktop VM, the method further comprising instantiating a set of two or more virtual desktop VMs including the first virtual desktop VM, wherein each virtual desktop VM is associated with a different remote user such that no two remote users access a same virtual desktop.

* * * * *